(12) United States Patent
Määttanen et al.

(10) Patent No.: US 11,564,144 B2
(45) Date of Patent: Jan. 24, 2023

(54) RADIO ACCESS NETWORK MOBILITY IN NON-GEOSYNCHRONOUS SATELLITE SYSTEMS

(71) Applicant: Telefonaktiebolaget LM Ericsson (publ), Stockholm (SE)

(72) Inventors: Helka-Liina Määttanen, Helsinki (FI); Henrik Rydén, Solna (SE); Jonas Sedin, Sollentuna (SE); Sebastian Euler, Storvreta (SE); Xingqin Lin, Santa Clara, CA (US); Zhenhua Zou, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 11 days.

(21) Appl. No.: 17/257,896

(22) PCT Filed: Sep. 18, 2019

(86) PCT No.: PCT/SE2019/050880
§ 371 (c)(1),
(2) Date: Jan. 5, 2021

(87) PCT Pub. No.: WO2020/067962
PCT Pub. Date: Apr. 2, 2020

(65) Prior Publication Data
US 2021/0274414 A1    Sep. 2, 2021

Related U.S. Application Data

(60) Provisional application No. 62/737,663, filed on Sep. 27, 2018.

(51) Int. Cl.
H04W 36/30    (2009.01)
H04W 76/28    (2018.01)
H04W 76/11    (2018.01)
H04W 76/27    (2018.01)
H04W 88/04    (2009.01)
(Continued)

(52) U.S. Cl.
CPC .......... H04W 36/305 (2018.08); H04W 76/11 (2018.02); H04W 76/27 (2018.02); H04W 76/28 (2018.02); H04W 88/04 (2013.01)

(58) Field of Classification Search
CPC ... H04W 36/305; H04W 76/11; H04W 76/27; H04W 76/28; H04W 88/04; H04W 40/36;
(Continued)

(56) References Cited

U.S. PATENT DOCUMENTS 6,058,307 A    5/2000    Garner
2017/0289822 A1    10/2017    Hreha et al.
(Continued)

FOREIGN PATENT DOCUMENTS

WO    2016205765 A1    12/2016

OTHER PUBLICATIONS

3GPP TR 38.811; V15.0.0 (Jun. 2018); 3rd Generation Partnership Project; Technical Specification Group Radio Access Network; Study on New Radio (NR) to support non terrestrial networks (Release 15). (Year: 2018).*
(Continued)

Primary Examiner — Mohammed S Chowdhury
(74) Attorney, Agent, or Firm — Sage Patent Group

(57) ABSTRACT

A method is performed by a wireless device. The method includes receiving, from a network, an indication for the wireless device to prepare for a change from a first ground station to a second ground station. Each of the first ground station and the second ground station is configured to communicate with the wireless device via one or more satellites. The method further includes preparing to change from the first ground station to the second ground station. The method further includes communicating with the second ground station via the one or more satellites.

20 Claims, 14 Drawing Sheets

---

1412
Determining that a wireless device should prepare for a change from a first ground station to a second ground station, each ground station adapted to communicate with the wireless device via one or more satellites.

1414
Sending an indication to the wireless device indicating that the wireless device should prepare for the change from the first ground station to the second ground station.

(58) Field of Classification Search
CPC . H04W 28/0226; H04W 52/40; H04W 48/04; H04W 84/06; H04B 7/18541; H04B 7/18517; H04B 7/1851
See application file for complete search history.

(56) References Cited

U.S. PATENT DOCUMENTS

| | | | |
|---|---|---|---|
| 2019/0082481 A1* | 3/2019 | Ravishankar | H04B 7/1851 |
| 2020/0029265 A1* | 1/2020 | Choquette | H04W 36/0011 |
| 2020/0052782 A1* | 2/2020 | Wang | H04W 74/006 |
| 2020/0077358 A1* | 3/2020 | Kovacs | H04W 4/022 |
| 2021/0083760 A1* | 3/2021 | Schmidt | H04B 7/18541 |
| 2021/0119698 A1* | 4/2021 | Atungsiri | H04B 7/2041 |
| 2021/0195675 A1* | 6/2021 | Park | H04W 76/18 |
| 2021/0329518 A1* | 10/2021 | Sharma | H04W 36/32 |

OTHER PUBLICATIONS

3GPP TR 38.821 V0.1.0 (Sep. 2018); 3rd Generation Partnership Project; Technical Specification Group Radio Access Network; Solutions for NR to support non-terrestrial networks (NTN) (Release 16). (Year: 2018).*

3GPP TSG RAN1 Meeting #93; R1-1807864; Source: Thales, IDC, Title: NR-NTN: solution principles for NR to support non-terrestrial networks, Busan, Korea, May 21-May 25, 2018. (Year: 2018).*

3GPP TSG-RAN3 Meeting #101; R3-184939; Title: Discussion on Non Terrestrial Network, Source: Huawei; Gothenburg, SE, Aug. 20-24, 2018 (Year: 2018).*

PCT International Search Report and Written Opinion, dated Dec. 3, 2019 for International Application No. PCT/SE2019/050880, 8 pages.

Thales, 3GPP TSG RAN Meeting #80, RP-181370, "Study on Solutions Evaluation for NR to Support Non Terrestrial Network", La Jolla, USA, Jun. 11-14, 2018, 5 pages.

3GPP, 3GPP TR 38.821, V16.0.0 (Dec. 2019), Technical Specification Group Radio Access Network, "Solutions for NR to Support Non-Terrestrial Networks (NTN)" (Release 16), Valbonne, France, 140 pages.

3GPP, 3GPP TR 38.811, V15.2.0 (Sep. 2019), Technical Specification Group Radio Access Network, "Study on New Radio (NR) to Support Non-Terrestrial Networks", (Release 15), Valbonne, France, 126 pages.

* cited by examiner

RADIO ACCESS NETWORK MOBILITY IN NON-GEOSYNCHRONOUS SATELLITE SYSTEMS

CROSS-REFERENCE TO RELATED APPLICATIONS

This application is a 35 U.S.C. § 371 national stage application for International Application No. PCT/SE2019/050880, entitled "RADIO ACCESS NETWORK MOBILITY IN NON-GEOSYNCHRONOUS SATELLITE SYSTEMS", filed on Sep. 18, 2019, the disclosures and contents of which are hereby incorporated by reference in their entireties. Further, the present application claims the benefit of and priority to U.S. Provisional Patent Application No. 62/737,663, filed on Sep. 27, 2018, entitled "METHODS FOR CONFIGURING UE TO PREPARE FOR MOVING RAN IN NON-GEO SATELLITE SYSTEMS", the disclosure of which is hereby incorporated herein by reference in its entirety.

TECHNICAL FIELD

Certain embodiments of the present disclosure relate, in general, to wireless communications and, more particularly, to non-terrestrial wireless communications.

BACKGROUND

There is an ongoing resurgence of satellite communications. Several plans for satellite networks have been announced in the past few years. The target services vary from backhaul and fixed wireless, to transportation, to outdoor mobile, to Internet-of-Things (IoT). Satellite networks could complement mobile networks on the ground by providing connectivity to underserved areas and multicast/broadcast services.

To benefit from the strong mobile ecosystem and economy of scale, adapting the terrestrial wireless access technologies, including Long Term Evolution (LTE) and New Radio (NR), for satellite networks is drawing significant interest. For example, the Third Generation Partnership Project (3GPP) completed an initial study in Release 15 on adapting NR to support non-terrestrial networks (mainly satellite networks) (Technical Report TR 38.811). This initial study focused on the channel model for the non-terrestrial networks, defining deployment scenarios, and identifying the key potential impacts. 3GPP is conducting a follow-up study item in Release 16 on solutions evaluation for NR to support non-terrestrial networks (RP-181370)

Satellite Communications

A satellite radio access network (RAN) usually includes the following:
- A gateway that connects a satellite network to core network
- A satellite, referring to a space-borne platform
- A terminal, referring to a terminal wireless device such as a user equipment (UE)
- A feeder link, referring to the link between a gateway and a satellite
- A service link, referring to the link between a satellite and a terminal The link from gateway to terminal is often called the forward link, and the link from terminal to gateway is often called the return link or the access link. Depending on the functionality of the satellite in the system, two transponder options can be considered:

Bent pipe transponder: the satellite forwards the received signal back to the earth with only amplification and a shift from uplink frequency to downlink frequency.

Regenerative transponder: the satellite includes on-board processing to demodulate and decode the received signal and regenerate the signal before sending it back to the earth.

Depending on the orbit altitude, a satellite may be categorized as low Earth orbit (LEO), medium Earth orbit (MEO), or geostationary (GEO) satellite.

LEO: typical heights ranging from 250-1,500 km, with orbital periods ranging from 90-130 minutes.

MEO: typical heights ranging from 5,000-25,000 km, with orbital periods ranging from 2-14 hours.

GEO: height at about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spotbeam. The footprint of a beam may move over the earth surface with the satellite movement or may be earth fixed with some beam pointing mechanism used by the satellite to compensate for its motion. The size of a spotbeam depends on the system design, which may range from tens of kilometers to a few thousands of kilometers. FIG. 1 shows an example architecture of a satellite network with bent pipe transponders.

In the 3GPP RAN #80 meeting, a new study item (SI) "Solutions for NR to support Non Terrestrial Network" was agreed (RP-108370). It is a continuation of a preceding SI "NR to support Non-Terrestrial Networks" (RP-171450), where the objective was to study the channel model for the non-terrestrial networks, to define deployment scenarios and parameters, and to identify the key potential impacts on NR. The results are reflected in 3GPP Technical Report 38.811.

The objectives of the current SI are to evaluate solutions for the identified key impacts from the preceding SI and to study impact on radio access network (RAN) protocols/architecture. The objectives for layer 2 and above are:

Study the following aspects and identify related solutions if needed: Propagation delay: Identify timing requirements and solutions on layer 2 aspects, MAC, RLC, RRC, to support non-terrestrial network propagation delays considering FDD and TDD duplexing mode. This includes radio link management. [RAN2]

Handover: Study and identify mobility requirements and necessary measurements that may be needed for handovers between some non-terrestrial space-borne vehicles (such as Non Geo stationary satellites) that move at much higher speed but over predictable paths [RAN2, RAN1]

Architecture: Identify needs for the 5G's Radio Access Network architecture to support non-terrestrial networks (e.g. handling of network identities) [RAN3]

Paging: procedure adaptations in case of moving satellite foot prints or cells

Note, the new study item does not address regulatory issues.

The coverage pattern of NTN is described in TR 38.811 in Section 4.6 as follows:

Satellite or aerial vehicles typically generate several beams over a given area. The foot print of the beams are typically elliptic shape.

The beam footprint may be moving over the earth with the satellite or the aerial vehicle motion on its orbit. Alternatively, the beam foot print may be earth fixed, in such case some beam pointing mechanisms (mechanical or electronic steering feature) will compensate for the satellite or the aerial vehicle motion.

TABLE 4.6-1

Typical beam footprint size

| Attributes | GEO | Non-GEO | Aerial |
|---|---|---|---|
| Beam foot print size in diameter | 200-1000 km | 100-500 km | 5-200 km |

Typical beam patterns of various NTN access networks are depicted in FIGS. 4.6-1 of TR 38.811, as reproduced herein as FIG. 2.

The Technical Report of the ongoing Study Item, TR 38.821, describes scenarios for the NTN work as follows:

Non-Terrestrial Network typically features the following elements [3]:

One or several sat-gateways that connect the Non-Terrestrial Network to a public data network a GEO satellite is fed by one or several sat-gateways which are deployed across the satellite targeted coverage (e.g. regional or even continental coverage). We assume that UE in a cell are served by only one sat-gateway A Non-GEO satellite served successively by one sat-gateway at a time. The system ensures service and feeder link continuity between the successive serving sat-gateways with sufficient time duration to proceed with mobility anchoring and hand-over Four scenarios are considered as depicted in Table 4.2-1 and are detailed in Table 4.2-2 of TR 38.821, which are reproduced below.

TABLE 4.2-1

Reference scenarios

| | Transparent satellite | Regenerative satellite |
|---|---|---|
| GEO based non-terrestrial access network | Scenario A | Scenario B |
| LEO based non-terrestrial access network | Scenario C | Scenario D |

TABLE 4.2-2

Reference scenario parameters

| | GEO based non-terrestrial access network (Scenario A and B) | LEO based non-terrestrial access network (Scenario C & D) |
|---|---|---|
| Scenarios | | |
| Orbit type | notional station keeping position fixed in terms of elevation/azimuth with respect to a given earth point | circular orbiting around the earth |
| Altitude | 35,786 km | 600 km<br>1,200 km |
| Spectrum (service link) | <6 GHz (e.g. 2 GHz)<br>>6 GHz (e.g. DL 20 GHz, UL 30 GHz) | |
| Max channel bandwidth (service link) | 30 MHz for band <6 GHz<br>400 MHz for band >6 GHz | |
| Payload | Scenario A: Transparent (including radio frequency function only)<br>Scenario B: regenerative (including all or part of RAN functions) | Scenario C: Transparent (including radio frequency function only)<br>Scenario D: Regenerative (including all or part of RAN functions) |
| Inter-Satellite link | No | Scenario C: No<br>Scenario D: Yes |
| Earth-fixed beams | Yes | Scenario C: No (the beams move with the satellite)<br>Scenario D, option 1: Yes (steering beams), see note 1<br>Scenario D, option 2: No (the beams move with the satellite) |
| Max beam foot print diameter at nadir | 500 km | 200 km |
| Min Elevation angle for both sat-gateway and user equipment | 10° | 10° |
| Max distance between satellite and user equipment at min elevation angle | 40,586 km | 1,932 km (600 km altitude)<br>3,131 km (1,200 km altitude) |
| Max Round Trip Delay (propagation delay only) | Scenario A: 562 ms (service and feeder links)<br>Scenario B: 281 ms | Scenario C: 25.76 ms (transparent payload: service and feeder links)<br>Scenario D: 12.88 ms (regenerative payload: service link only) |

TABLE 4.2-2-continued

| | Reference scenario parameters | |
|---|---|---|
| Max delay variation within a beam (earth fixed user equipment) | 16 ms | 4.44 ms (600 km) 6.44 ms (1200 km) |
| Max differential delay within a beam | 1.6 ms | 0.65 ms (*) |
| Max Doppler shift (earth fixed user equipment) | 0.93 ppm | 24 ppm (*) |
| Max Doppler shift variation (earth fixed user equipment) | 0.000 045 ppm/s | 0.27 ppm/s (*) |
| User equipment motion on the earth | 1000 km/h (e.g. aircraft) | 500 km/h (e.g. high speed train) Possibly 1000 km/h (e.g. aircraft) |
| User equipment antenna types | Omnidirectional antenna (linear polarisation), assuming 0 dBi Directive antenna (up to 60 cm equivalent aperture diameter in circular polarisation) | |
| User equipment Tx power | Omnidirectional antenna: UE power class 3 with up to 200 mW Directive antenna: up to 4 W | |
| User equipment Noise figure | Omnidirectional antenna: 7 dB Directive antenna: 1.2 dB | |
| Service link | 3GPP defined New Radio | |
| Feeder link | 3GPP or non-3GPP defined Radio interface | 3GPP or non-3GPP defined Radio interface |

NOTE 1:
Each satellite has the capability to steer beams towards fixed points on earth using beamforming techniques. This is applicable for a period of time corresponding to the visibility time of the satellite
NOTE 2:
Max delay variation within a beam (earth fixed user equipment) is calculated based on Min Elevation angle for both gateway and user equipment
NOTE 3:
Max differential delay within a beam is calculated based on Max beam foot print diameter at nadir For scenario D, which is LEO with regenerative payload, both earth-fixed and earth moving beams have been listed. So, when factoring in the fixed/non-fixed beams, there is an additional scenario. The complete list of 5 scenarios in TR 38.821 is then:

Scenario A—GEO, transparent satellite, Earth-fixed beams;

Scenario B—GEO, regenerative satellite, Earth fixed beams;

Scenario C—LEO, transparent satellite, Earth-moving beams;

Scenario D1—LEO, regenerative satellite, Earth-fixed beams;

Scenario D2—LEO, regenerative satellite, Earth-moving beams.

When NR or LTE is applied to provide the connectivity via satellites, it means that the ground station is a RAN node. In the case where the satellite is transparent, all RAN functionalities are on the ground which means the sat-gateway has whole eNB/gNB functionality. For the regenerative satellite payload, part or all, of the eNB/gNB processing may be on the satellite.

Radio-Link failure in NR/LTE is defined and reported when a sequence of events occurs at the UE. The UE monitors the downlink link quality based on the cell-specific reference signal, and compares it to the thresholds Qout and Qin. The threshold Qout is defined as the level at which the downlink radio link cannot be reliably received. The threshold Qin is defined as the level at which the downlink radio link quality can be significantly more reliably received than at Qout and typically corresponds to 2% block error rate of a hypothetical Physical Downlink Control Channel (PDCCH) transmission (taking into account the Physical Control Format Indicator Channel (PCFICH) errors in LTE).

SUMMARY

Non-Geo satellites move rapidly with respect to any given UE location. As an example, on a 2-hour orbit, a LEO satellite is in view of a stationary UE from horizon to horizon for about 20 minutes. Since each LEO satellite may have many beams, the time during which a UE stays within a beam is typically only a few minutes. The fast pace of satellite movement creates problems for paging as well as handoffs for both stationary and moving UEs.

Unlike terrestrial framework where a cell on the ground is tied to radio communication with a RAN, in non-GEO satellite access network, the satellite beams may be moving. There may be no fixed correspondence between cells on the ground and satellite beams. The same geographical region on the ground can be covered by different satellites and different beams over time. When one LEO satellite's beam moves away from the geographical area, another LEO satellite's beam (e.g., generated by the same LEO satellite or by a neighboring LEO satellite) may be expected to come in and cover the same geographical area. From the UE's perspective, this may mean that the ground serving RAN node changes when the gateway changes. This situation is not present in normal terrestrial networks.

Accordingly, there exist certain challenges. In a moving RAN, the ground station for the satellite ("sat-gateway") changes as the satellite moves, as illustrated in FIG. 3. FIG. 3 illustrates an example situation of a satellite changing from gateway 1 to gateway 2.

A non-GEO satellite is served successively by one sat-gateway at a time. That means that the UE can keep the connection to the satellite, while the satellite changes the ground station. There are several issues related to changing the ground station while preserving the physical cell identity (PCI) of the first gateway. For example there may be an idle period of the satellite transmission, when the satellite switches its connection to the first gateway to the second gateway. Further, the timing advance values configured towards the first gateway would be required to be updated to the second gateway. Moreover, the downlink timing based on the distance/delay of the combined distance or timing delay between the UE, satellite and gateway would require updated. For example, the example distance T1+T3 of FIG. 3 may be updated to the new distance T1+T2, representing the change from Gateway 1 to Gateway 2.

Certain aspects of the present disclosure and their embodiments may provide solutions to these or other challenges. For example, certain embodiments provide methods for handling UE mobility when the RAN node switches while the UE is connected via NR/LTE air interface. In brief, the methods are used to prepare the UE with an RRC configuration for the upcoming change of sat-gateway. Certain embodiments provide system information parameters to assist IDLE mode UEs for a RAN switch. There are, proposed herein, various embodiments which address one or more of the issues disclosed herein.

According to an embodiment, a method is performed by a wireless device. The method includes receiving, from a network, an indication for the wireless device to prepare for a change from a first ground station to a second ground station. Each of the first ground station and the second ground station is configured to communicate with the wireless device via one or more satellites. The method further includes preparing to change from the first ground station to the second ground station. The method further includes communicating with the second ground station via the one or more satellites.

According to another embodiment, a computer program product includes a non-transitory computer readable medium storing computer readable program code. The computer readable program code comprises program code operable to perform the above method.

According to yet another embodiment, a wireless device comprises a memory configured to store instructions and processing circuitry configured to execute the instructions. The wireless device is configured to receive, from a network, an indication for the wireless device to prepare for a change from a first ground station to a second ground station. Each of the first ground station and the second ground station is configured to communicate with the wireless device via one or more satellites. The wireless device is further configured to prepare to change from the first ground station to the second ground station. The wireless device is further configured to communicate with the second ground station via the one or more satellites.

In certain embodiments, the method/wireless device/computer program product may have one or more additional and/or optional features, such as one or more of the following:

In particular embodiments, the indication is received while the wireless device is in a connected mode.

In particular embodiments, the indication is received via radio resource control (RRC) signaling.

In particular embodiments, the indication is received while the wireless device is in idle mode.

In particular embodiments, the indication is received via a broadcast message.

In particular embodiments, the indication is received via the one or more satellites.

In particular embodiments, the indication comprises one or more parameters that the wireless device uses to prepare for the change to the second ground station. In some embodiments, the parameters comprise one or more of: an indication whether a physical cell identity (PCI) associated with a cell providing coverage to the wireless device will change in connection with changing to the second ground station; an indication of a change in system information; an indication of a change of any radio access network (RAN) identification; an indication of a change of a timing advance (TA) assumption; an indication of a change of downlink frequency; and an indication of a change of uplink frequency adjustment assumption. In some embodiments, the indication further indicates a time when the one or more parameters are valid. In some embodiments, the time is indicated based on a timer or based on when a primary or secondary cell is at a configured elevation angle.

In particular embodiments, the indication indicates a time when the change from the first ground station to the second ground station will occur.

In particular embodiments, the indication indicates to start a connected discontinuous reception (DRX) during the change from the first ground station to the second ground station.

In particular embodiments, the method/wireless device/computer program product further includes using a first configuration prior to the change from the first ground station to the second ground station and using a second, different configuration when preparing for the change from the first ground station to the second ground station. In some embodiments, the second configuration is based on one or more of the parameters comprising one or more of: an indication whether a physical cell identity (PCI) associated with a cell providing coverage to the wireless device will change in connection with changing to the second ground station; an indication of a change in system information; an indication of a change of any radio access network (RAN) identification; an indication of a change of a timing advance (TA) assumption; an indication of a change of downlink frequency; and an indication of a change of uplink frequency adjustment assumption.

In particular embodiments, the method/wireless device/computer program product further includes sending a response message via the one or more satellites. The response message comprises at least one of: a confirmation that the wireless device received the indication to prepare for the change from the first ground station to the second ground station; a confirmation that the wireless device has applied a configuration associated with changing to the second ground station; and an indication that the wireless device has failed to apply the configuration associated with changing to the second ground station.

In particular embodiments, preparing for the change from the first ground station to the second ground station comprises adjusting one or more parameters or assumptions associated with Radio Link Failure (RLF) during the change from the first ground station to the second ground station.

According to an embodiment, a method is performed by a network node. The method includes determining that a wireless device should prepare for a change from a first ground station to a second ground station. Each of the first ground station and the second ground station is configured to communicate with the wireless device via one or more satellites. The method further includes sending an indication to the wireless device indicating that the wireless device should prepare for the change from the first ground station to the second ground station.

According to another embodiment, a computer program product includes a non-transitory computer readable medium storing computer readable program code. The computer readable program code comprises program code operable to perform the method immediately above.

According to another embodiment, a network node comprises a memory configured to store instructions and processing circuitry configured to execute the instructions. The network node is configured to determine that a wireless device should prepare for a change from a first ground station to a second ground station. Each of the first ground station and the second ground station is configured to communicate with the wireless device via one or more satellites. The network node is further configured to send an indication to the wireless device indicating that the wireless device should prepare for the change from the first ground station to the second ground station.

In certain embodiments, the method/network node/computer program product may have one or more additional and/or optional features, such as one or more of the following:

In particular embodiments, the indication is sent while the wireless device is in a connected mode.

In particular embodiments, the indication is sent via radio resource control (RRC) signaling.

In particular embodiments, the indication is sent while the wireless device is in idle mode.

In particular embodiments, the indication is sent via a broadcast message.

In particular embodiments, the indication is sent via the one or more satellites.

In particular embodiments, the network node is implemented on one of the one or more satellites.

In particular embodiments, the method/network node/computer program product further includes determining one or more parameters that the wireless device is to use to prepare for the change to the second ground station. The indication indicates the one or more parameters to the wireless device. In some embodiments, the parameters comprise one or more of: an indication whether a physical cell identity (PCI) associated with a cell providing coverage to the wireless device will change in connection with changing to the second ground station; an indication of a change in system information; an indication of a change of any radio access network (RAN) identification; an indication of a change of a timing advance (TA) assumption; an indication of a change of downlink frequency; and an indication of a change of uplink frequency adjustment assumption. In some embodiments, the indication further indicates a time when the one or more parameters are valid. In some embodiments, the time is indicated based on a timer or based on when a primary or secondary cell is at a configured elevation angle.

In particular embodiments, the indication indicates a time when the change from the first ground station to the second ground station will occur.

In particular embodiments, the indication further indicates to start a connected discontinuous reception (DRX) during the change from the first ground station to the second ground station.

In particular embodiments, the method/network node/computer program product further includes using a first configuration to communicate with the wireless device prior to the change from the first ground station to the second ground station and using a second, different configuration to communicate with the wireless device in response to changing from the first ground station to the second ground station. In some embodiments, the second configuration is based on one or more of the parameters comprising one of more of: an indication whether a physical cell identity (PCI) associated with a cell providing coverage to the wireless device will change in connection with changing to the second ground station; an indication of a change in system information; an indication of a change of any radio access network (RAN) identification; an indication of a change of a timing advance (TA) assumption; an indication of a change of downlink frequency; and an indication of a change of uplink frequency adjustment assumption.

In particular embodiments, the method/network node/ computer program product further includes receiving a response message from the wireless device. The response message comprising at least one of: a confirmation that the wireless device received the indication to prepare for the change from the first ground station to the second ground station; a confirmation that the wireless device has applied a configuration associated with changing to the second ground station; or an indication that the wireless device has failed to apply the configuration associated with changing to the second ground station.

In particular embodiments, the indication further indicates that the wireless device is to adjust one or more parameters or assumptions associated with Radio Link Failure (RLF) during the change from the first ground station to the second ground station.

Certain embodiments may provide one or more of the following technical advantages. For example, certain embodiments introduce signaling options to support smoother switching of satellite gateways for non-geostationary satellite network nodes. An abrupt switch may cause the loss of the UE Radio Resource Control (RRC) connection. As a result, the UE may be required to enter an IDLE mode and start searching for a new cell for which the reference signals may not be immediately ready. Additionally, if the RRC connection is ended, measurements may be required to be reconfigured after the UE is in connected mode again (e.g., once UE has managed to find and attach to new cell). As another example, certain embodiments avoid multiple simultaneous uplink transmissions from many UEs during a change of satellite gateways. For example, a handover for all UEs during a switch of gateways will lead to large amount of signaling at the same time. Similarly, multiple UEs declaring radio-link failure, e.g., due to a change of gateway, will lead to a high number of UEs trying to perform new random access requests. Certain embodiments may reduce the signaling associated with a ground station switch by indicating a pending or anticipated switch of satellite gateways.

Certain embodiments may have none, some, or all of the above-recited advantages. Other advantages may be readily apparent to one having skill in the art.

BRIEF DESCRIPTION OF THE DRAWINGS

For a more complete understanding of the disclosed embodiments and their features and advantages, reference is now made to the following description, taking in conjunction with the accompanying drawings, in which.

DETAILED DESCRIPTION

Figure 1:
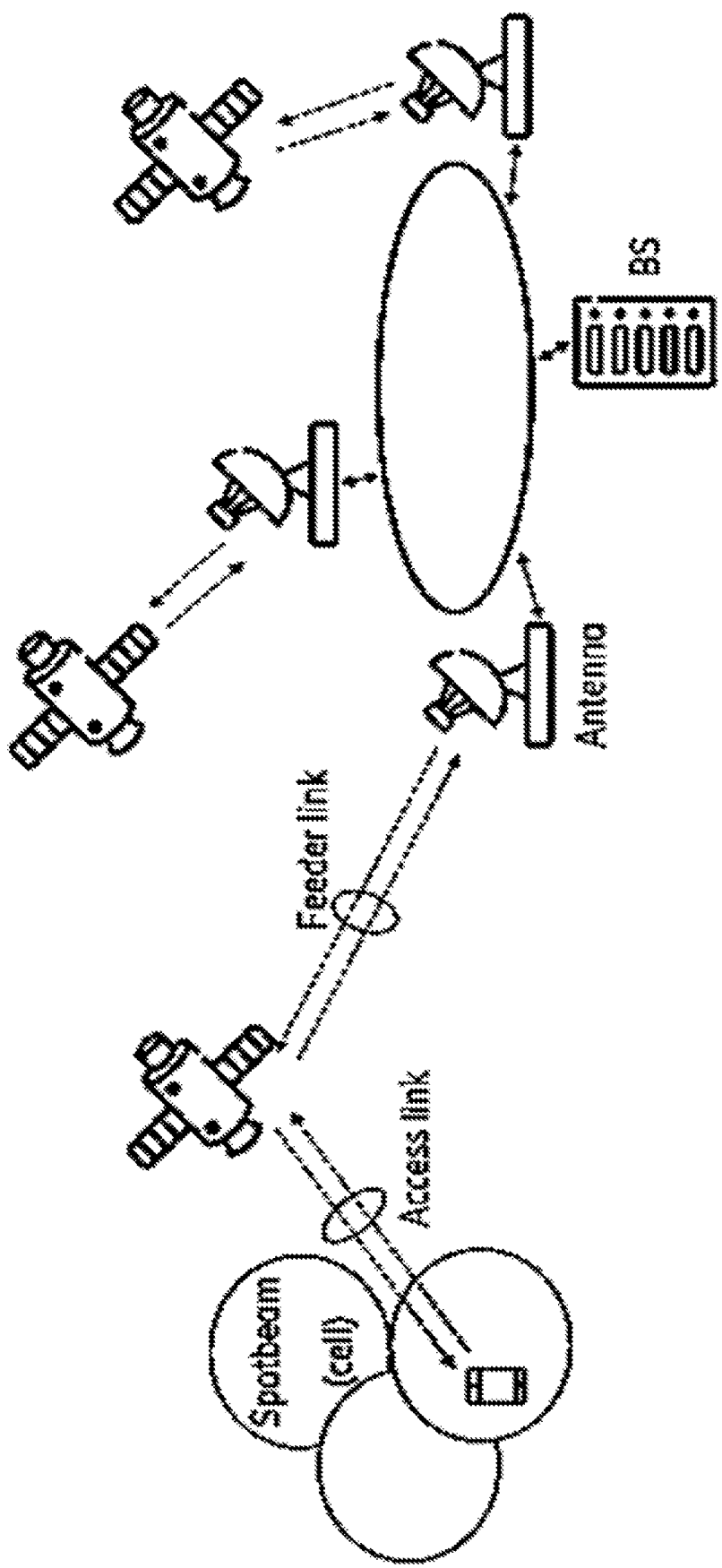
FIG. 1 illustrates an non-terrestrial wireless communications network, in accordance with certain embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Although certain aspects of the present disclosure describe problems and solutions using NR terminology, it should be understood that the same solutions apply to LTE as well where applicable.

The present disclosure provides several methods to mitigate the problems related to a switch of ground sat-gateways. Certain embodiments may impart the same or different advantages depending on the particular networking scenario, implementation, or architecture of the network Several categories of embodiments are disclosed herein that may incorporate one or more of the features detailed below.

For Connected Mode Wireless Devices

In a first set of embodiments, a wireless device, e.g., a UE, can be RRC configured (e.g., configured via signaling on a control channel) to be prepared for an upcoming switch of the RAN (e.g., between RANs at different satellite gateways (sat-gateways)). According to some embodiments, the configuration provided to the wireless device may include one or more parameters. For example, in some embodiments, the anticipated RAN switch time may be a parameter in the configuration to the UE. Time may be expressed as a common time reference between RAN and UEs, such as an absolute time (e.g., GPS time, UTC time) or a common reference in relation to system frame number (SFN) in the radio frames. This may include when the downlink (DL) reference signal (RS) is switched off and/or switch ON. As another example, in some embodiments, an indication whether the Physical Cell Identity (PCI) will change or not may be include in the configuration. In some embodiments, the indication may include or not include the new PCI that will take over if it changes. Accordingly, the wireless device may be informed whether, after the RAN switch, the same PCI will be sent from the satellite taking over the geographical area or if it uses different PCI.

In certain embodiments, one or more of the following may be included in the configuration of the wireless device in anticipation of a change in satellite gateways:

An indication of the switch or change of any RAN information

An indication of change in system information may be included in the configuration An indication of a change of the timing advance (TA) assumption An indication of a change of downlink frequency An indication of a change of uplink frequency adjustment assumption Any of the above potential indications may be further, according to some embodiments, with one or more time indications when (e.g., for how long or in what time period(s)) the respective indications are valid.

According to certain embodiments, the wireless device may be indicated to start connected mode DRX while the switch happens. In some embodiments, the configuration may indicate an inactive period that is longer than currently specified (e.g., using the current satellite gateway). Further, in some embodiments, the indication may indicate whether to do a random access procedure (RACH) after the switch (e.g., when starting the next active period). In this manner, the UE may determine whether to assume the same TA or the same average TA after the switch.

According to certain embodiments, the wireless device receives an indication of when the configuration becomes valid. For example, in some embodiments, the configuration also includes a time, time range, or timer for which the configuration is valid. In some embodiments, the wireless device is provided with one or more conditions to apply the configuration. For example, the wireless device may be instructed to switch to the other RRC configuration when a primary or a secondary cell is at a configured elevation angle, position, or other condition.

In certain embodiments, the wireless device, e.g., UE, may be configured to send a response to the RRC configuration. In some embodiments, the wireless device communicates a confirmation at reception of RRC configuration. In some embodiments, a confirmation when the configuration is applied may be sent. For example, there may be one or more conditions that should be satisfied for the configuration to become valid. If the configuration fails, the wireless device may communicate a failure in response to indicate the failed application of the configuration. As a result, a new configuration may be provided or alternative procedures may be carried out by the wireless device and/or network.

In certain embodiments, the wireless device may be configured to behave in a particular way during the RAN switch. For example, Radio Link Failure (RLF) related parameters and assumptions may be configured differently during the RAN switch to keep the wireless device connected during the switch. In some embodiments, the RLF related parameters may include one or more of the following:

N number of out-of-sync indications needed to start an RLF timer

N number of automatic repeat request (ARQ) retransmissions to declare an RLF

An indication to stop the wireless device from monitoring for RLF for a period of time An indication to stop an RLF timer if running In this manner, the wireless device may be prevented from inappropriately declaring an RLF during a switch of gateways.

For Inactive/Idle Mode Wireless Devices

In a second set of embodiments, a wireless device, e.g., a UE, can be RRC configured (e.g., configured via signaling on a control channel) to be prepared for an upcoming switch of the RAN (e.g., between RANs at different satellite gateways (sat-gateways)). Since the wireless device may be in an inactive or idle mode, the network may broadcast a message that may be used by the wireless device in switching RANs. In certain embodiments, the broadcast message from the network may indicate one or more of the following:

The time when the RAN switch will happen. Time may be expressed as a common time reference between RAN and UEs, such as an absolute time (e.g., GPS time, UTC time) or a common reference in relation to system frame number (SFN) in the radio frames. This may include when the DL RS is switched off and/or switch ON.

An indication if PCI will change or not. In some embodiments, with the new PCI that will take over. Alternatively, in other embodiments, without the new PCI.

An indication of a change in the system information

An indication of a switch of any RAN identification

An indication of a change of the TA assumption

An indication of a change of the downlink frequency

An indication of a change of the uplink frequency adjustment assumption

The above may be with time indication when these are valid

Any of the above potential indications may be further, according to some embodiments, with one or more time indications when (e.g., for how long or in what time period(s)) the respective indications are valid.

Figure 4:
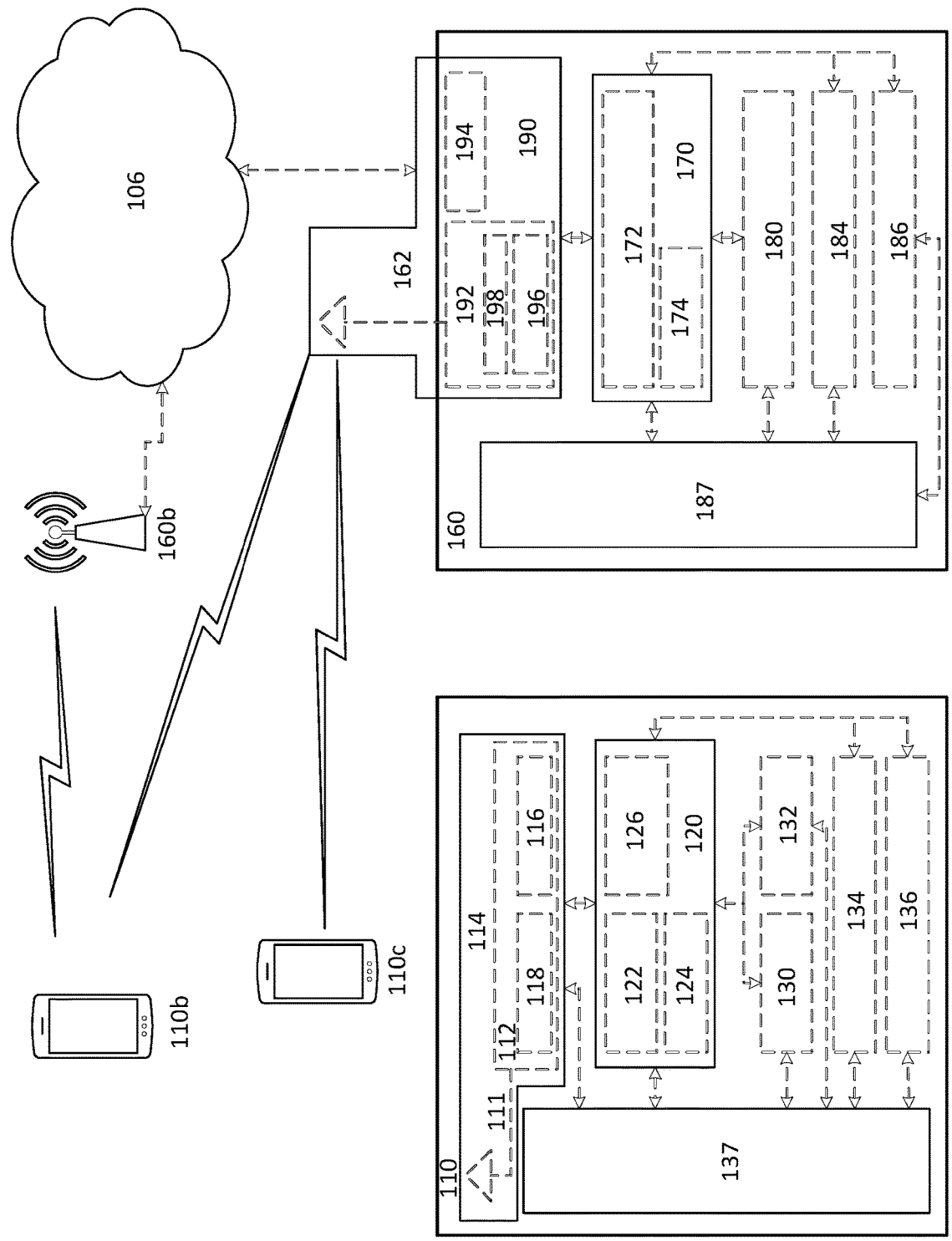
FIG. 4 illustrates an example wireless network, in accordance with certain embodiments.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 160 includes processing circuitry 170, device readable medium 180, interface 190, auxiliary equipment 184, power source 186, power circuitry 187, and antenna 162. Although network node 160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 4 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 5:
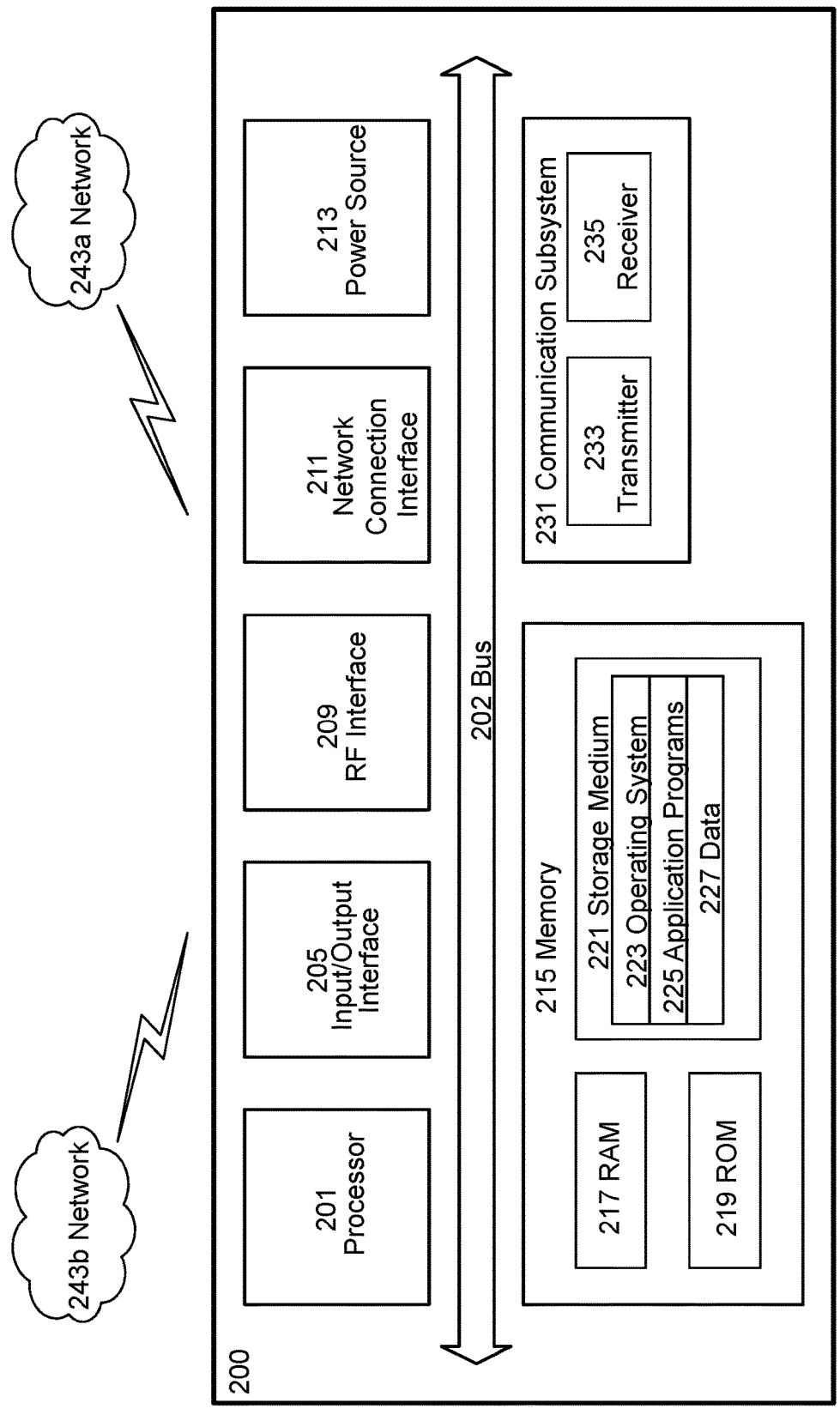
FIG. 5 illustrates an example user equipment, in accordance with certain embodiments.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 220 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 5, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 5, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 6:
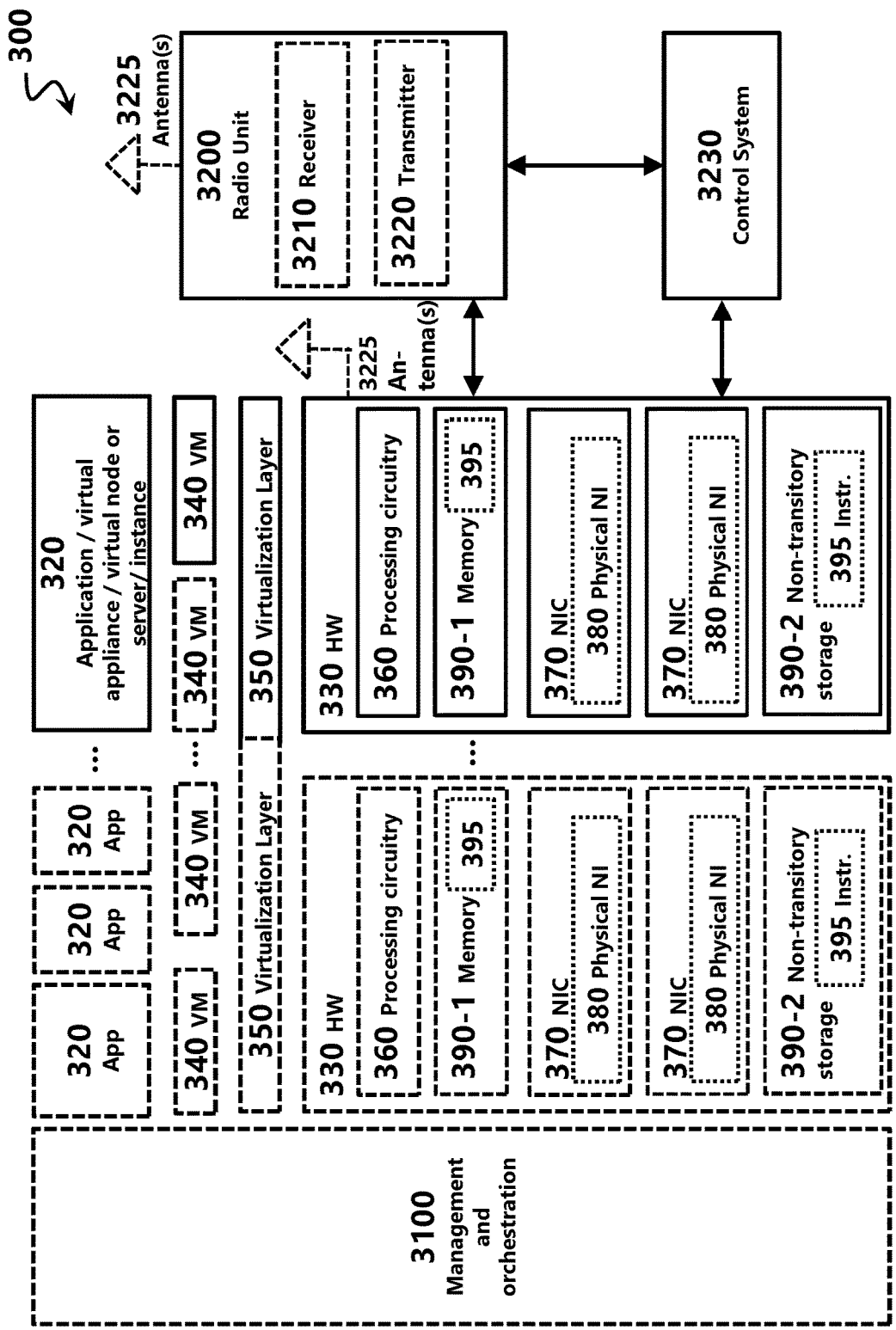
FIG. 6 illustrates an example virtualization environment, in accordance with certain embodiments.

FIG. 6 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 6, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 6.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 7:
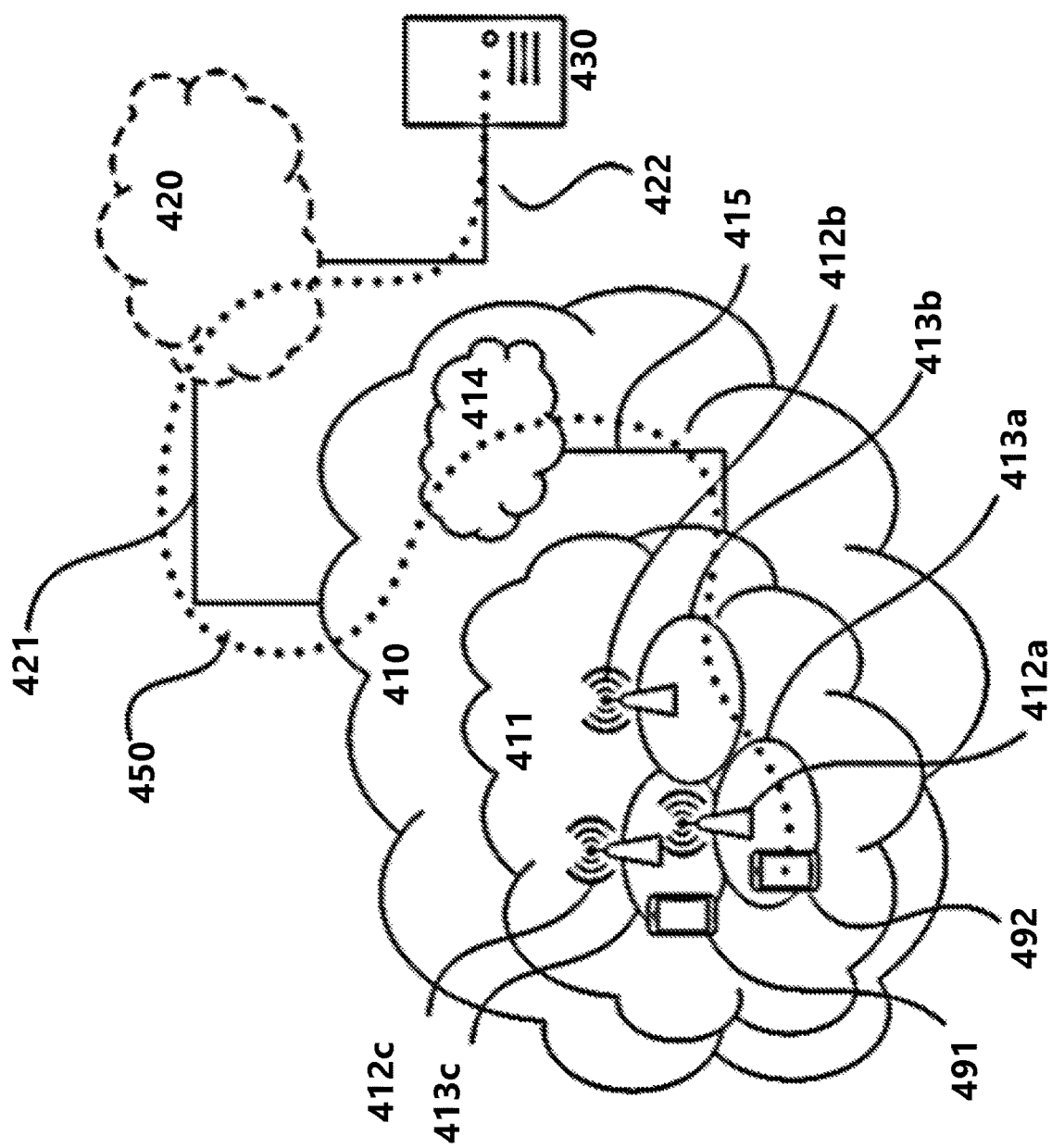
FIG. 7 illustrate an example telecommunication network connected via an intermediate network to a host computer, in accordance with certain embodiments.

With reference to FIG. 7, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 7 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 8. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 5) served by base station 520. Communication interface 526 may be configured to facilitate connection 560 to host computer 510. Connection 560 may be direct or it may pass through a core network (not shown in FIG. 8) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 8:
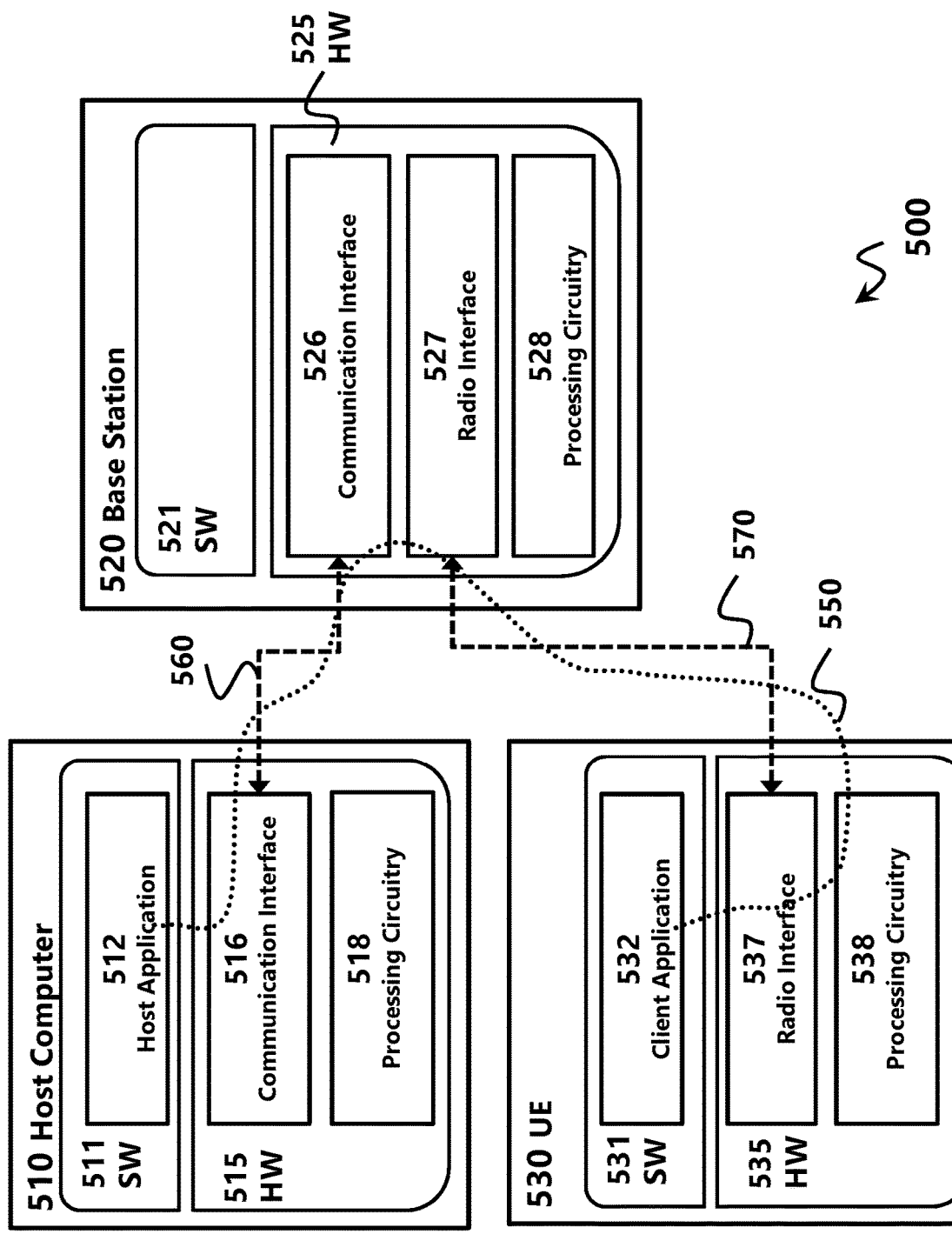
FIG. 8 illustrates an example host computer communicating via a base station with a user equipment over a partially wireless connection, in accordance with certain embodiments.

It is noted that host computer 510, base station 520 and UE 530 illustrated in FIG. 8 may be similar or identical to host computer 430, one of base stations 412a, 412b, 412c and one of UEs 491, 492 of FIG. 7, respectively. This is to say, the inner workings of these entities may be as shown in FIG. 8 and independently, the surrounding network topology may be that of FIG. 7.

In FIG. 8, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the latency and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 9:
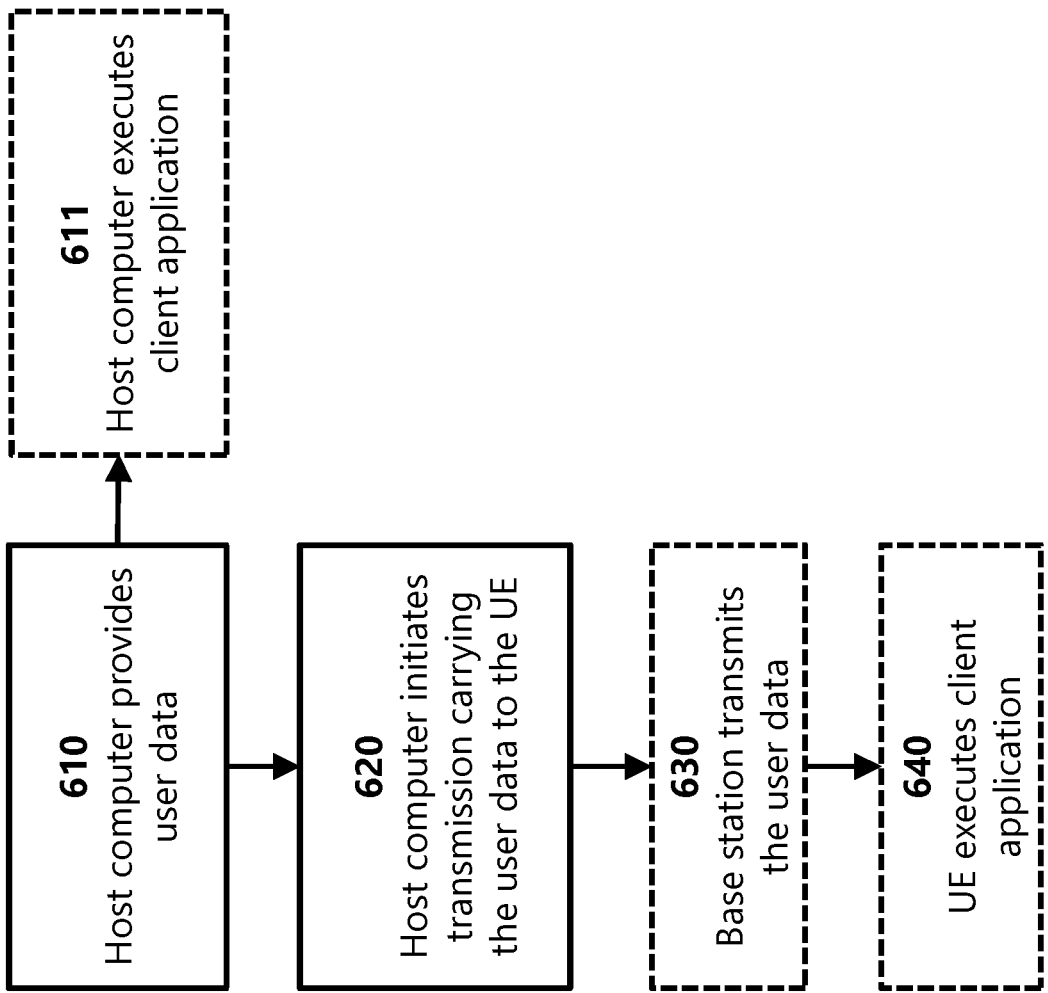
FIG. 9 is a flowchart illustrating an example method implemented in a communication system, in accordance certain embodiments.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 10:
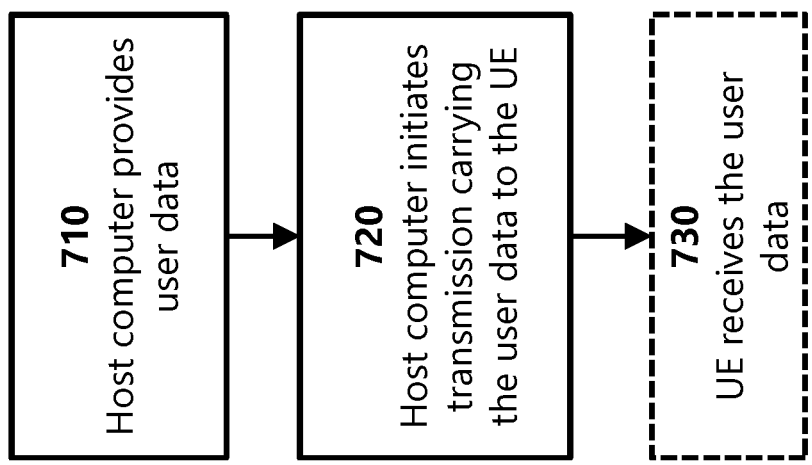
FIG. 10 is a flowchart illustrating a second example method implemented in a communication system, in accordance with certain embodiments.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 11:
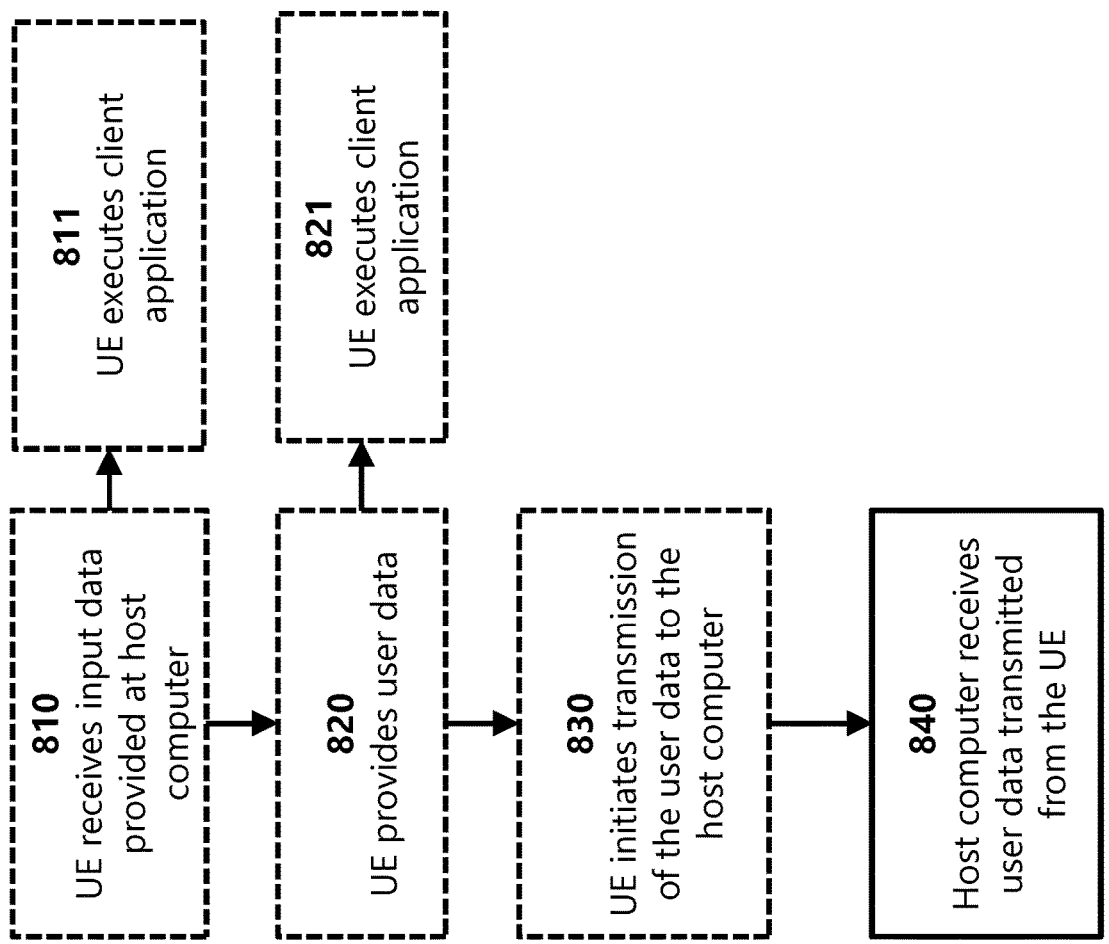
FIG. 11 is a flowchart illustrating a third method implemented in a communication system, in accordance with certain embodiments.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 12:
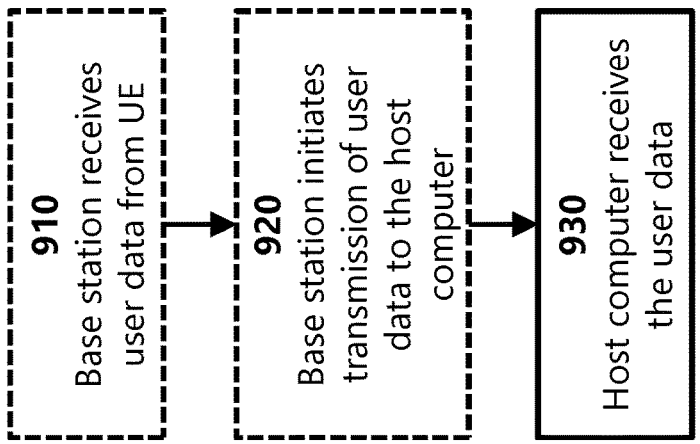
FIG. 12 is a flowchart illustrating a fourth method implemented in a communication system, in accordance with certain embodiments.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 13:
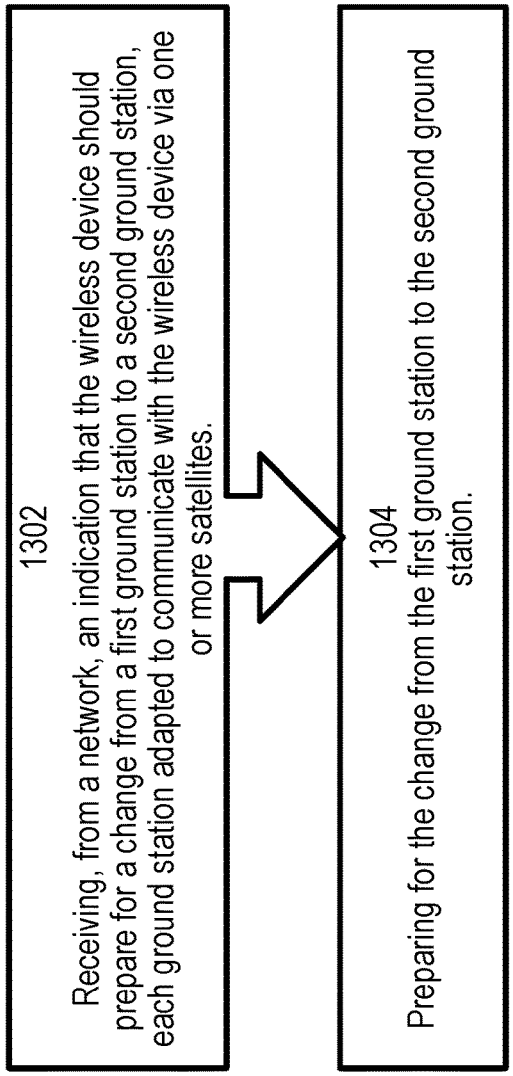
FIG. 13 illustrates a first example method performed by a wireless device, in accordance with certain embodiments.

FIG. 13 depicts a method in accordance with particular embodiments, the method begins at step 1302 with from a network, an indication that the wireless device should prepare for a change from a first ground station to a second ground station, each ground station adapted to communicate with the wireless device via one or more satellites. The method continues to step 1304 with preparing for the change from the first ground station to the second ground station.

Figure 14:
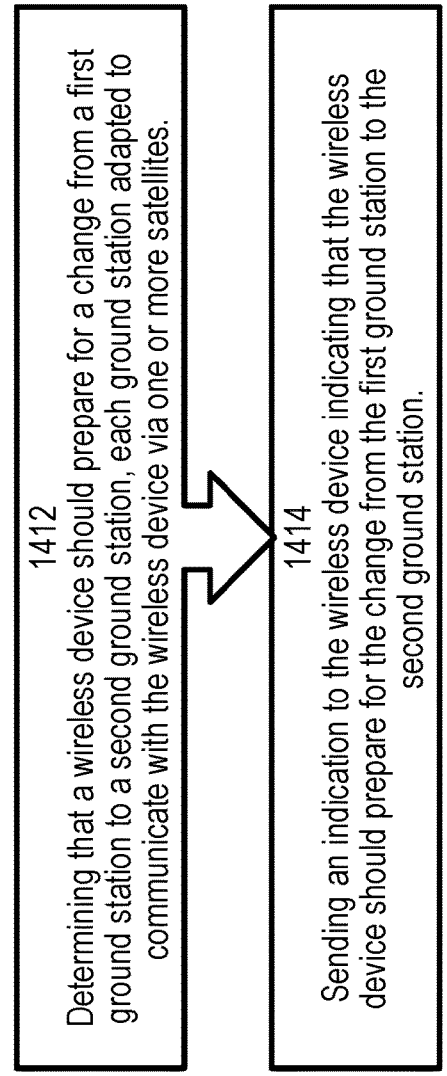
FIG. 14 illustrates a second example method performed by a wireless device, in accordance with certain embodiments.

FIG. 14 depicts a method in accordance with particular embodiments, the method begins at step 1412 with determining that a wireless device should prepare for a change from a first ground station to a second ground station, each ground station adapted to communicate with the wireless device via one or more satellites. The method continues to step 1414 with sending an indication to the wireless device indicating that the wireless device should prepare for the change from the first ground station to the second ground station.

Figure 15:
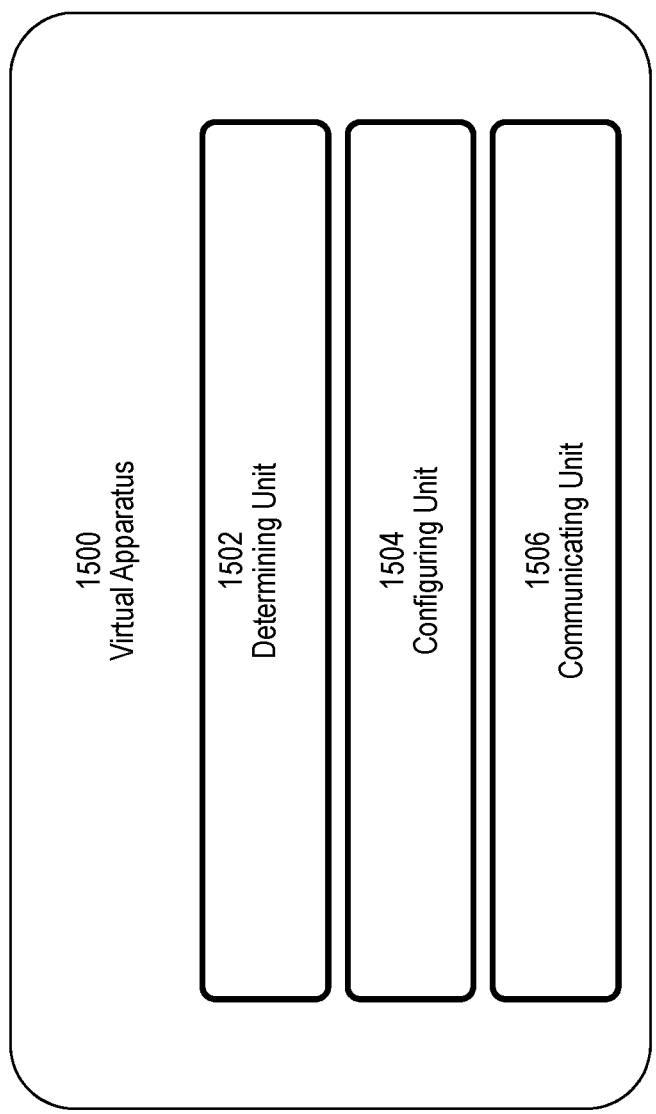
FIG. 15 illustrates a schematic block diagram of a first example apparatus in a wireless network, in accordance with certain embodiments.

FIG. 15 illustrates a schematic block diagram of an apparatus 1500 in a wireless network (for example, the wireless network shown in FIG. 4). The apparatus may be implemented in a wireless device or network node (e.g., wireless device 110 or network node 160 shown in FIG. 4). Apparatus 1500 is operable to carry out the example method(s) described with reference to FIGS. 13 and 14 and possibly any other processes or methods disclosed herein. It is also to be understood that the methods of FIGS. 13 and 14 are not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining unit 1502, configuring unit 1504, communicating unit 1506, and any other suitable units of apparatus 1500 to perform corresponding functions according one or more embodiments of the present disclosure.

As illustrated in FIG. 15, apparatus 1500 includes determining unit 1502, configuring unit 1504, and communicating unit 1506. In certain embodiments, determining unit 1502 is configured to determine when a change from a first ground station and a second ground station will occur. In certain embodiments, determining unit 1502 is configured to determine parameters to be used by a wireless device to prepare for changing from the first ground station and the second ground station (e.g., parameters that should be used during and/or after changing to the second ground station). In certain embodiments, the determining may be performed based on detecting/analysing network conditions and/or based on information obtained from a network node (e.g., a ground station or satellite). In certain embodiments, configuring unit 1504 is configured to apply a first configuration prior to changing to the second ground station and to apply a second, different configuration during and/or after changing to the second ground station. In certain embodiments, communicating unit 1506 facilitates communication between the wireless device and the network. As an example, communicating unit 1506 may be configured to receive an indication from the network indicating that the wireless device should prepare for a change from a first ground station to a second ground station (and may optionally send a response) when communicating unit 1506 is implemented in the wireless device. As another example, communicating unit 1506 may be configured to send the wireless device an indication that the wireless device should prepare for a change from a first ground station to a second ground station (and optionally receive a response from the wireless device) when communicating unit 1506 is implemented in a network node (e.g., ground station or satellite).

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

SAMPLE EMBODIMENTS

Group A Embodiments

1. A method performed by a wireless device, the method comprising:
   receiving, from a network, an indication that the wireless device should prepare for a change from a first ground station to a second ground station, each ground station adapted to communicate with the wireless device via one or more satellites; and
   preparing for the change from the first ground station to the second ground station.

2. The method of the previous embodiment, wherein the indication is received while the wireless device is in connected mode.

3. The method of any of the previous embodiments, wherein the indication is received via radio resource control (RRC) signaling.

4. The method of embodiment 1, wherein the indication is received while the wireless device is in idle mode.

5. The method of any of the previous embodiments, wherein the indication is received via a broadcast message.

6. The method of any of the previous embodiments, wherein the indication is received via the one or more satellites.

7. The method of any of the previous embodiments, wherein the indication comprises one or more parameters that the wireless device uses to prepare for the change to the second ground station.

8. The method of any of the previous embodiment, wherein the parameters comprise one or more of:
   an indication whether a physical cell identity (PCI) associated with a cell providing coverage to the wireless device will change in connection with changing to the second ground station;
   an indication of a change in system information;
   an indication of a change of any radio access network (RAN) identification;
   an indication of a change of a timing advance (TA) assumption;
   an indication of a change of downlink frequency; and
   an indication of a change of uplink frequency adjustment assumption.

9. The method of any of embodiments 7-8, wherein the indication further indicates a time when the one or more parameters are valid.

10. The method of the previous embodiment, where the time is indicated based on a timer or based on when a primary or secondary cell is at a configured elevation angle.

11. The method of any of the previous embodiments, wherein the indication indicates a time when the change from the first ground station to the second ground station will occur.

12. The method of any of the previous embodiments, wherein the indication further indicates to start a connected discontinuous reception (DRX) while the change from the first ground station to the second ground station occurs.

13. The method of any of the previous embodiments, further comprising:
using a first configuration prior to the change from the first ground station to the second ground station; and
using a second, different configuration when preparing for the change from the first ground station to the second ground station.

14. The method of the previous embodiment, wherein the second configuration is based on one or more of the parameters of example embodiment 8.

15. The method of any of the previous embodiments, further comprising sending a response message via the one or more satellites, the response message comprising at least one of:
a confirmation that the wireless device received the indication to prepare for the change from the first ground station to the second ground station,
a confirmation that the wireless device has applied a configuration associated with changing to the second ground station; or
an indication that the wireless device has failed to apply the configuration associated with changing to the second ground station.

16. The method of any of the previous claims, wherein preparing for the change from the first ground station to the second ground station further comprises:
adjusting one or more parameters or assumptions associated with Radio Link Failure (RLF) during the change from the first ground station to the second ground station.

17. The method of any of the previous embodiments, further comprising:
providing user data; and
forwarding the user data to a host computer via the transmission to the base station.

Group B Embodiments

18. A method performed by a network node, the method comprising:
determining that a wireless device should prepare for a change from a first ground station to a second ground station, each ground station adapted to communicate with the wireless device via one or more satellites; and
sending an indication to the wireless device indicating that the wireless device should prepare for the change from the first ground station to the second ground station.

19. The method of the previous embodiment, wherein the indication is sent while the wireless device is in connected mode.

20. The method of any of the previous embodiments, wherein the indication is sent via radio resource control (RRC) signaling.

21. The method of embodiment 18, wherein the indication is sent while the wireless device is in idle mode.

22. The method of any of the previous embodiments, wherein the indication is sent via a broadcast message.

23. The method of any of the previous embodiments, wherein the indication is sent via the one or more satellites.

24. The method of any of the previous embodiments, wherein the network node is one of the satellites.

25. The method of any of the previous embodiments, further comprising:
determining one or more parameters that the wireless device is to use to prepare for the change to the second ground station;
wherein the indication indicates the one or more parameters to the wireless device.

26. The method of any of the previous embodiment, wherein the parameters comprise one or more of:
an indication whether a physical cell identity (PCI) associated with a cell providing coverage to the wireless device will change in connection with changing to the second ground station;
an indication of a change in system information;
an indication of a change of any radio access network (RAN) identification;
an indication of a change of a timing advance (TA) assumption;
an indication of a change of downlink frequency; and
an indication of a change of uplink frequency adjustment assumption.

27. The method of any of embodiments 25-26, wherein the indication further indicates a time when the one or more parameters are valid.

28. The method of the previous embodiment, where the time is indicated based on a timer or based on when a primary or secondary cell is at a configured elevation angle.

29. The method of any of the previous embodiments, wherein the indication indicates a time when the change from the first ground station to the second ground station will occur.

30. The method of any of the previous embodiments, wherein the indication further indicates to start a connected discontinuous reception (DRX) while the change from the first ground station to the second ground station occurs.

31. The method of any of the previous embodiments, further comprising:
using a first configuration to communicate with the wireless device prior to the change from the first ground station to the second ground station; and
using a second, different configuration to communicate with the wireless device in response to changing from the first ground station to the second ground station.

32. The method of the previous embodiment, wherein the second configuration is based on one or more of the parameters of example embodiment 26.

33. The method of any of the previous embodiments, further comprising receiving a response message from the wireless device, the response message comprising at least one of:
a confirmation that the wireless device received the indication to prepare for the change from the first ground station to the second ground station,
a confirmation that the wireless device has applied a configuration associated with changing to the second ground station; or
an indication that the wireless device has failed to apply the configuration associated with changing to the second ground station.

34. The method of any of the previous claims, wherein the indication further indicates that the wireless device is to adjust one or more parameters or assumptions associated with Radio Link Failure (RLF) during the change from the first ground station to the second ground station.

35. The method of any of the previous embodiments, further comprising:
   obtaining user data; and
   forwarding the user data to a host computer or a wireless device.

Group C Embodiments

36. A wireless device, the wireless device comprising:
   processing circuitry configured to perform any of the steps of any of the Group A embodiments; and
   power supply circuitry configured to supply power to the wireless device.

37. A network node, the base station comprising:
   processing circuitry configured to perform any of the steps of any of the Group B embodiments;
   power supply circuitry configured to supply power to the base station.

38. A user equipment (UE), the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.

39. A computer program, the computer program comprising instructions which when executed on a computer perform any of the steps of any of the Group A embodiments.

40. A computer program product comprising a computer program, the computer program comprising instructions which when executed on a computer perform any of the steps of any of the Group A embodiments.

41. A non-transitory computer-readable storage medium or carrier comprising a computer program, the computer program comprising instructions which when executed on a computer perform any of the steps of any of the Group A embodiments.

42. A computer program, the computer program comprising instructions which when executed on a computer perform any of the steps of any of the Group B embodiments.

43. A computer program product comprising a computer program, the computer program comprising instructions which when executed on a computer perform any of the steps of any of the Group B embodiments.

44. A non-transitory computer-readable storage medium or carrier comprising a computer program, the computer program comprising instructions which when executed on a computer perform any of the steps of any of the Group B embodiments.

45. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B embodiments.

46. The communication system of the pervious embodiment further including the base station.

47. The communication system of the previous 2 embodiments, further including the UE, wherein the UE is configured to communicate with the base station.

48. The communication system of the previous 3 embodiments, wherein:
   the processing circuitry of the host computer is configured to execute a host application, thereby providing the user data; and
   the UE comprises processing circuitry configured to execute a client application associated with the host application.

49. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of the Group B embodiments.

50. The method of the previous embodiment, further comprising, at the base station, transmitting the user data.

51. The method of the previous 2 embodiments, wherein the user data is provided at the host computer by executing a host application, the method further comprising, at the UE, executing a client application associated with the host application.

52. A user equipment (UE) configured to communicate with a base station, the UE comprising a radio interface and processing circuitry configured to performs the of the previous 3 embodiments.

53. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's components configured to perform any of the steps of any of the Group A embodiments.

54. The communication system of the previous embodiment, wherein the cellular network further includes a base station configured to communicate with the UE.

55. The communication system of the previous 2 embodiments, wherein:
   the processing circuitry of the host computer is configured to execute a host application, thereby providing the user data; and
   the UE's processing circuitry is configured to execute a client application associated with the host application.

56. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of the Group A embodiments.

57. The method of the previous embodiment, further comprising at the UE, receiving the user data from the base station.

58. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

59. The communication system of the previous embodiment, further including the UE.

60. The communication system of the previous 2 embodiments, further including the base station, wherein the base station comprises a radio interface configured to communicate with the UE and a communication interface configured to forward to the host computer the user data carried by a transmission from the UE to the base station.

61. The communication system of the previous 3 embodiments, wherein:
the processing circuitry of the host computer is configured to execute a host application; and
the UE's processing circuitry is configured to execute a client application associated with the host application, thereby providing the user data.

62. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

63. A method implemented in a communication system including a host computer, a base station and a user equipment (UE), the method comprising:
at the host computer, receiving user data transmitted to the base station from the UE, wherein the UE performs any of the steps of any of the Group A embodiments.

64. The method of the previous embodiment, further comprising, at the UE, providing the user data to the base station.

65. The method of the previous 2 embodiments, further comprising:
at the UE, executing a client application, thereby providing the user data to be transmitted; and
at the host computer, executing a host application associated with the client application.

66. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

67. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

68. The communication system of the previous embodiment further including the base station.

69. The communication system of the previous 2 embodiments, further including the UE, wherein the UE is configured to communicate with the base station.

70. The communication system of the previous 3 embodiments, wherein:
the processing circuitry of the host computer is configured to execute a host application;
the UE is configured to execute a client application associated with the host application, thereby providing the user data to be received by the host computer.

71. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

72. The method of the previous embodiment, further comprising at the base station, receiving the user data from the UE.

73. The method of the previous 2 embodiments, further comprising at the base station, initiating a transmission of the received user data to the host computer.

Figure 2:
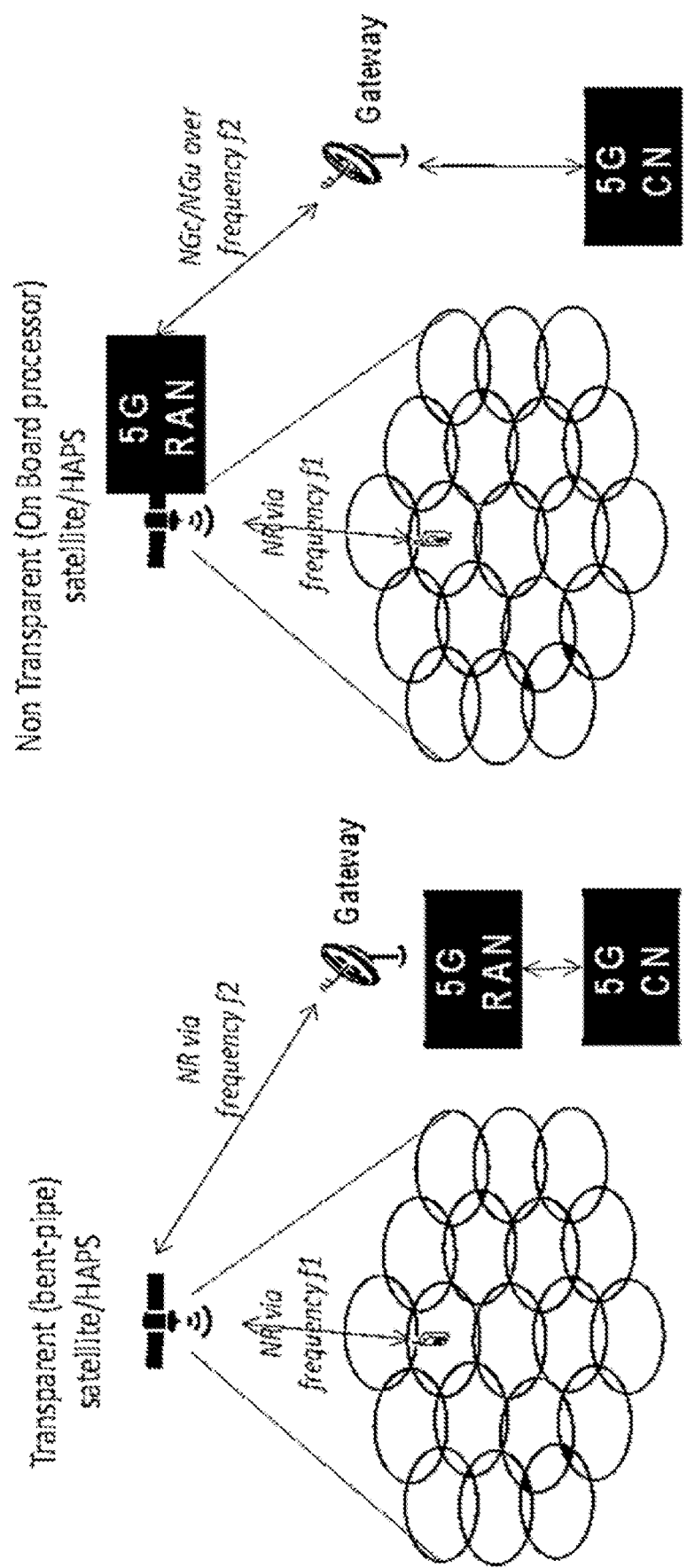
FIG. 2 illustrates a pair of non-terrestrial network configurations, in accordance with certain embodiments.
Figure 3:
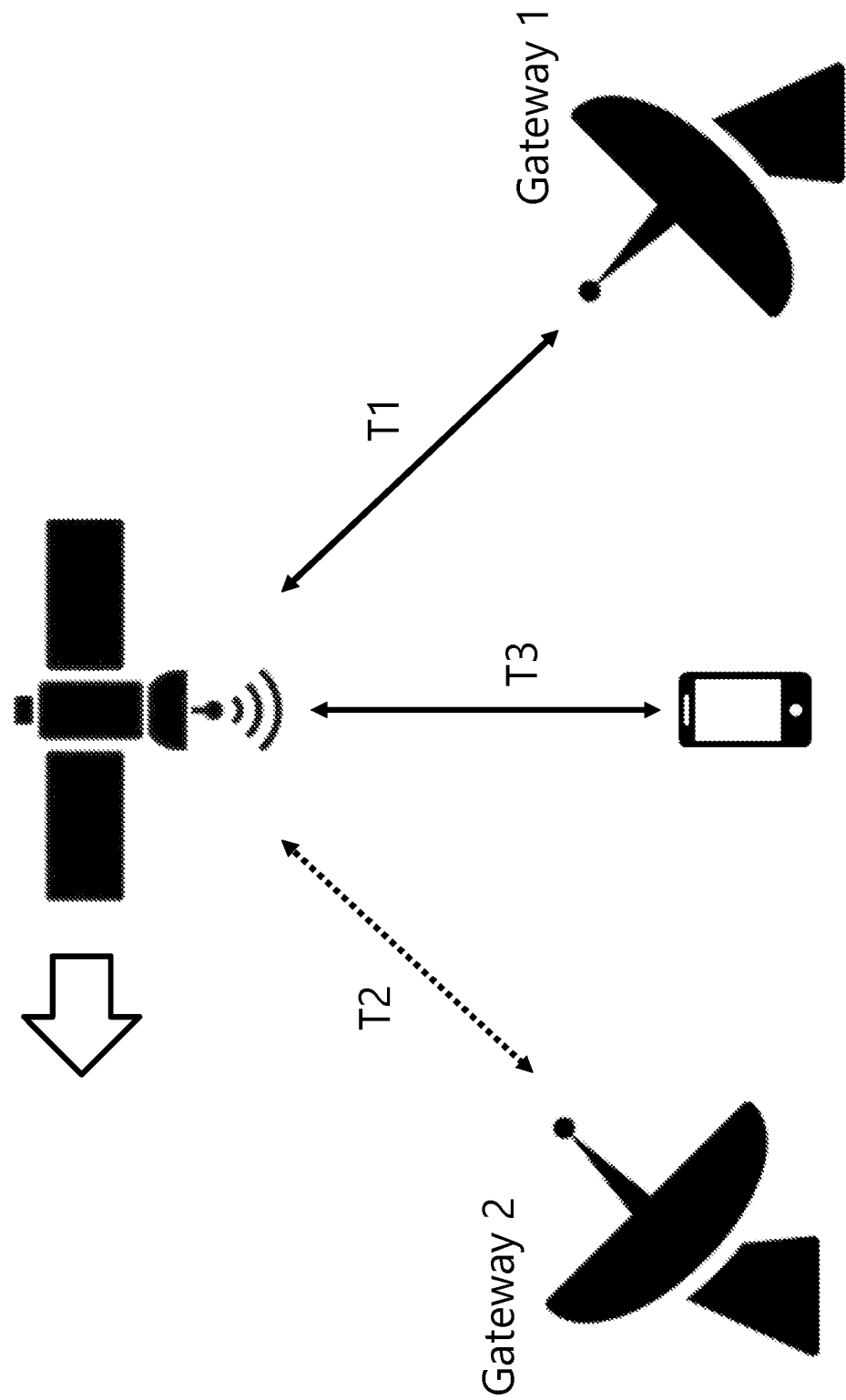
FIG. 3 illustrates an example satellite network node changing gateways, in accordance with certain embodiments.
Figure 16:
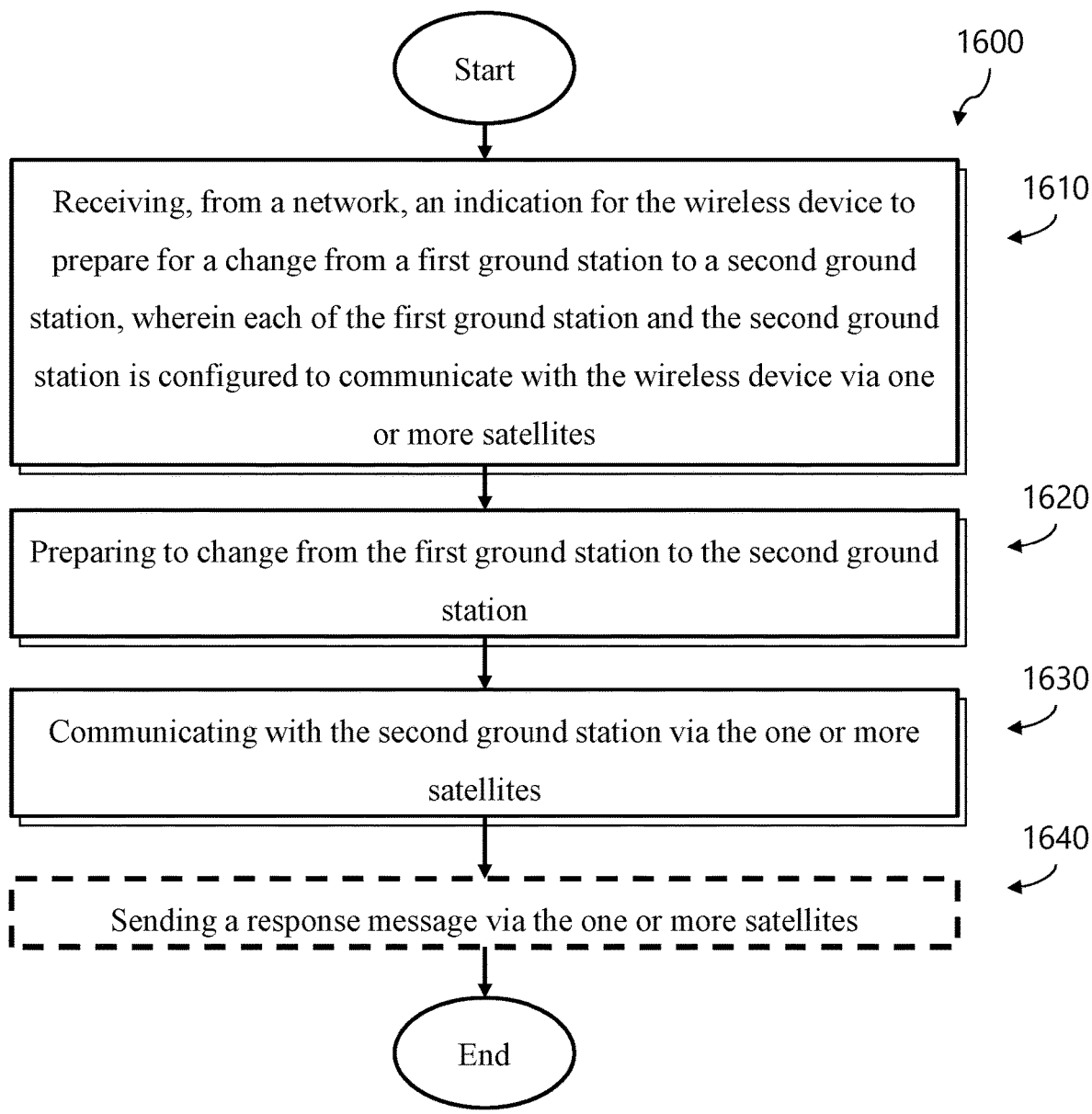
FIG. 16 illustrates a third example method performed by a wireless device, in accordance with certain embodiments.

FIG. 16 illustrates an example flowchart for a third example method 1600 for use in a wireless device, such as wireless device 110*b* or 110*c* or wireless device 200 described above in reference to FIGS. 4 and 5. Method 1600 may begin at step 1610 in which an indication for the wireless device to prepare for a change from a first ground station to a second ground station is received from a network, e.g., the wireless network shown in FIG. 4. Each of the first ground station and the second ground station is configured to communicate with the wireless device via one or more satellites, e.g., as shown in FIGS. 2 and 3. As one example, the indication may be received by the wireless device via the one or more satellites.

In certain embodiments, the indication is received while the wireless device is in a connected mode, e.g., involving the first ground station. In some embodiments, the indication may be a configuration received via radio resource control RRC. In certain embodiments, the indication is received while the wireless device is in a disconnected or idle mode. In some embodiments, the indication is received via a broadcast message from the network.

In certain embodiments, the indication comprises one or more parameters that the wireless device uses to prepare for the change to the second ground station. As described above, the parameters may include one or more of various parameters that allow the wireless device to switch more smoothly. For example, the parameters may include one or more of an indication whether a physical cell identity (PCI) associated with a cell providing coverage to the wireless device will change in connection with changing to the second ground station; an indication of a change in system information; an indication of a change of any radio access network (RAN) identification; an indication of a change of a timing advance (TA) assumption; an indication of a change of downlink frequency; and an indication of a change of uplink frequency adjustment assumption.

In certain embodiments, the indication further indicates a time when the one or more parameters are valid. In some embodiments the time is indicated based on a timer or based on when a primary or secondary cell is at a configured elevation angle. In this manner, the wireless device may apply the updated configuration only when it is proper (e.g., after the switch or after a set time after the switch begins).

In certain embodiments, the indication indicates a time when the change from the first ground station to the second ground station will occur. The wireless device may use this time to determine when to change configurations, probe for reference signals, etc. In some embodiments, the indication indicates to start a connected discontinuous reception (DRX) during the change from the first ground station to the second ground station. Accordingly, the wireless device may save power and be prevented from declaring a radio link failure if the switch will be delayed or take more than a predetermined period of time to complete.

At step 1620, the wireless device prepares to change from the first ground station to the second ground station. For example, the wireless device may implement the information provided in the indication to ready the wireless device to switch over and communicate with the second ground station, e.g., via the one or more satellites. For example, in certain embodiments, the wireless device uses a first configuration prior to the change from the first ground station to the second ground station and uses a second, different configuration when preparing for the change from the first ground station to the second ground station. The second configuration may be based on one or more parameters indicated in the indication from the network and/or one or more measurements or determinations made by the wireless device using the provided indication or information obtained thereupon.

In certain embodiments, the preparation includes adjusting one or more parameters or assumptions associated with Radio Link Failure (RLF) during the change from the first ground station to the second ground station. For example, the wireless device may adjust one of the following when preparing for the switch the N number of out-of-sync indications needed to start an RLF timer or the N number of automatic repeat request (ARQ) retransmissions to declare an RLF. Further, in some embodiments, the wireless device may stop monitoring for RLF for a period of time based on the provided indication. Further, in some embodiments, the indication may cause the wireless device to stop an RLF timer if running.

At step 1630, the wireless device communicates with the second ground station via the one or more satellites. For example, using the indication and information obtained using the indication to prepare for the switch may allow for the wireless device to more smoothly switch to the second ground station and communicate with the radio access network via the one or more satellites. As described herein, the indication may allow the wireless device to apply a different configuration and/or change or use one or more different parameters that aid in the switchover. Accordingly, the wireless device may successfully switch over and communicate with reduced delay and rate of failure.

In certain embodiments, method 1600 may include one or more additional or optional steps or substeps. For example, in certain embodiments, method 1600 includes the optional step 1640 in which a response message is sent via the one or more satellites in response to the indication received in step 1610. In some embodiments, the response includes a confirmation that the wireless device received the indication to prepare for the change from the first ground station to the second ground station. In some embodiments, the response includes a confirmation that the wireless device has applied a configuration associated with changing to the second ground station. In some embodiments, the response includes an indication that the wireless device has failed to apply the configuration associated with changing to the second ground station. In this manner, the network may be informed of the status of the wireless device and whether the indication was received and applied. In some embodiments, the network may fallback to legacy or fallback techniques when the configuration is not applied or no such confirmation response is received.

Figure 17:
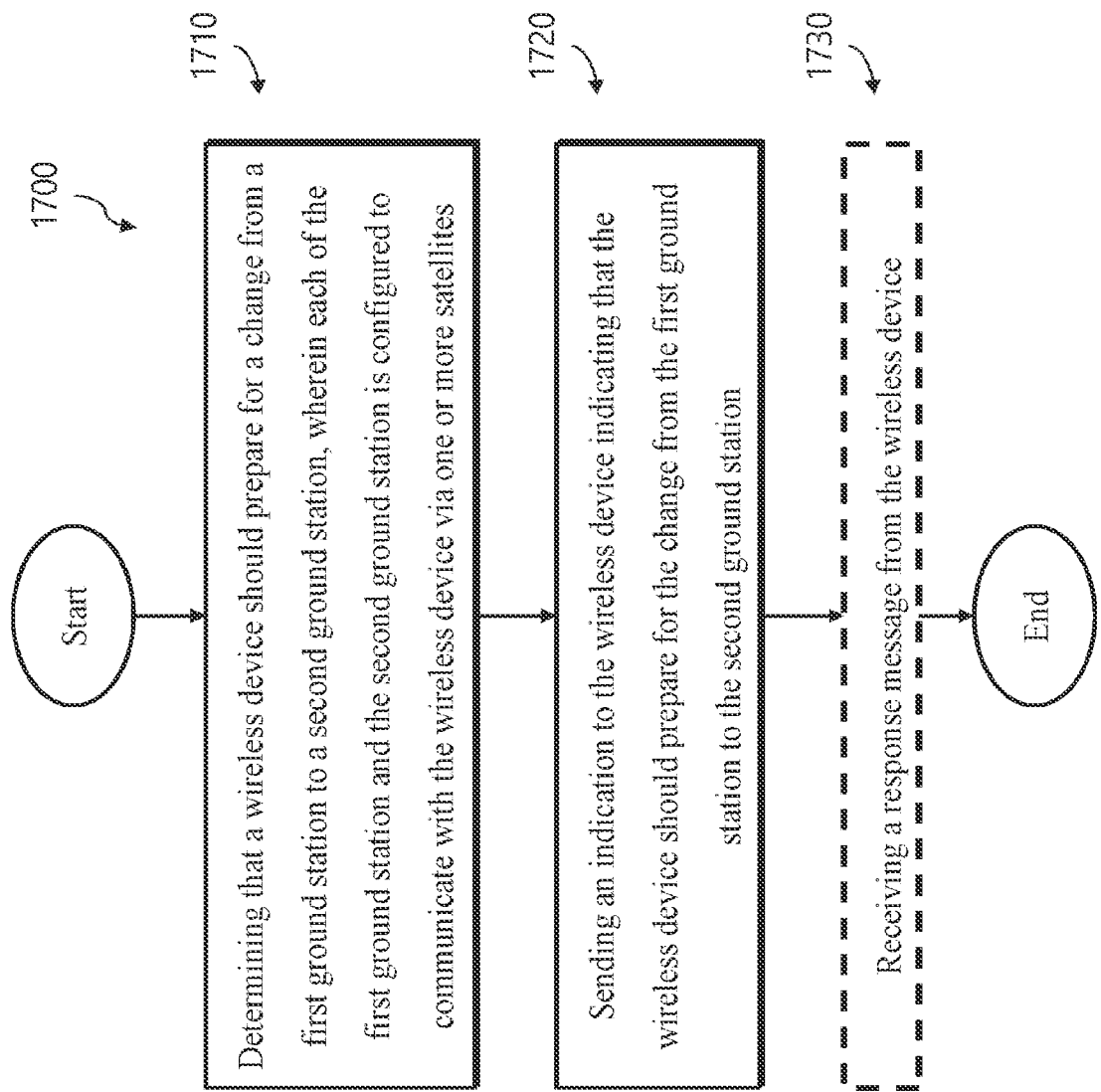
FIG. 17 illustrates an example method performed by a network node, in accordance with certain embodiments.

FIG. 17 illustrates an example flowchart for an example method 1700 for use in a wireless device, for use in a network node, such as network node 160 as described above in reference to FIG. 4. Method 1700 may begin at 1710, in which the network node determines that a wireless device, e.g., wireless device 110*b* or 110*c* or wireless device 200 described above in reference to FIGS. 4 and 5, should prepare for a change from a first ground station to a second ground station. For example, the network node may determine that given the trajectory of the one or more satellites and/or the trajectory or pattern of the beams of the one or more satellites, that a satellite covering the wireless device may need to switch ground stations. For example, to maintain coverage, the one or more satellites may be switched from the first ground station to the second ground station, both of which are configured to communicate with the wireless device via the one or more satellites. In some embodiments, the network node is implemented on one of the one or more satellites.

At step 1720, an indication is sent to the wireless device indicating that the wireless device should prepare for the change from the first ground station to the second ground station. The indication may be provided via RRC or via a broadcast message. The indication may include information that enables the wireless device to more smoothly switch between radio access networks represented by the different ground stations. For example, the indication may include any information described herein, e.g., in reference to FIG. 16 above, that a wireless device may use to prepare for the switch.

In certain embodiments, before sending the indication to the wireless device, the network node may determine one or more parameters that the wireless device is to use to prepare for the change to the second ground station. For example, the network node may determine any of the parameters discussed herein that should be used in the switchover. For example, these parameters may indicate a different configuration to use when communicating with the second ground station as compared to the first ground station. As another example, the parameters may be determined to increase the probability that the wireless device does not inadvertently declare a radio link failure during the switch or apply the configuration at the wrong time(s). In this manner, the indication may indicate the one or more parameters to the wireless device. In some embodiments, the indication includes the actual parameters determined. In some embodiments, the indication includes sufficient information for the wireless device to determine or obtain the parameters determined by the network node.

In certain embodiments, method 1700 may include one or more additional or optional steps or substeps. In certain embodiments, method 1700 may include optional step 1730 in which the network node further receives a response message from the wireless device in response to the indication communicated to the wireless device. The response message may include a confirmation that the indication was received or applied or an indication of a failure to apply the new configuration.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

The invention claimed is:

1. A method performed by a wireless device, the method comprising:
receiving, from a network, an indication for the wireless device to prepare for a change from a first ground station to a second ground station, wherein each of the first ground station and the second ground station is configured to communicate with the wireless device via one or more satellites, wherein the indication indicates to start a connected discontinuous reception (DRX) during the change from the first ground station to the second ground station, so that the wireless device saves power and does not declare a Radio Link Failure (RLF) if the change from the first ground station to the second ground station takes more than a predetermined period of time to complete;
preparing to change from the first ground station to the second ground station based on the received indication; and
communicating with the second ground station via the one or more satellites.

2. The method of claim 1, wherein the indication is received via the one or more satellites while the wireless device is in a connected mode or an idle mode; and
wherein the indication is received via:
radio resource control (RRC) signaling in the connected mode; or
a broadcast message in the connected mode or in the idle mode.

3. The method of claim 1, wherein the indication comprises one or more parameters that the wireless device uses to prepare for the change to the second ground station; and
wherein the one or more parameters comprises information indicating one or more of:
whether a physical cell identity (PCI) associated with a cell providing coverage to the wireless device will change in connection with the changing to the second ground station;
a change in system information;
a change of any radio access network (RAN) identification;
a change of a timing advance (TA) assumption;
a change of downlink frequency; and
a change of uplink frequency adjustment assumption.

4. The method of claim 3, wherein the indication further indicates a time when the one or more parameters are valid, and wherein the time is indicated based on a timer or based on when a primary or secondary cell is at a configured elevation angle.

5. The method of claim 1, wherein the indication further indicates a time when the change from the first ground station to the second ground station will occur.

6. The method of claim 1, further comprising:
using a first configuration prior to the change from the first ground station to the second ground station; and
using a second configuration, different from the first configuration, when preparing for the change from the first ground station to the second ground station.

7. The method of claim 6, wherein the second configuration is based on one or more parameters comprising information indicating one or more of:
whether a physical cell identity (PCI) associated with a cell providing coverage to the wireless device will change in connection with the changing to the second ground station;
a change in system information;
a change of any radio access network (RAN) identification;
a change of a timing advance (TA) assumption;
a change of downlink frequency; and
a change of uplink frequency adjustment assumption.

8. The method of claim 1, further comprising sending a response message via the one or more satellites, the response message comprising at least one of:
a confirmation that the wireless device has received the indication to prepare for the change from the first ground station to the second ground station,
a confirmation that the wireless device has applied a configuration associated with the changing to the second ground station; and
a notification that the wireless device has failed to apply the configuration associated with the changing to the second ground station.

9. The method of claim 1, wherein the preparing for the change from the first ground station to the second ground station comprises:
adjusting one or more parameters or assumptions associated with the RLF during the change from the first ground station to the second ground station.

10. A method performed by a network node, the method comprising:
determining that a wireless device should prepare for a change from a first ground station to a second ground station, wherein each of the first ground station and the second ground station is configured to communicate with the wireless device via one or more satellites; and
sending an indication to the wireless device indicating that the wireless device should prepare for the change from the first ground station to the second ground station, wherein the indication indicates to start a connected discontinuous reception (DRX) during the change from the first ground station to the second ground station, so that the wireless device saves power and does not declare a Radio Link Failure (RLF) if the change from the first ground station to the second ground station takes more than a predetermined period of time to complete.

11. The method of claim 10, wherein the indication is sent via the one or more satellites while the wireless device is in a connected mode or an idle mode; and
wherein the indication is sent via:
radio resource control (RRC) signaling in the connected mode; or
a broadcast message in the connected mode or in the idle mode.

12. The method of claim 10, wherein the network node is implemented on one of the one or more satellites.

13. The method of claim 10, further comprising:
determining one or more parameters that the wireless device is to use to prepare for the change to the second ground station,
wherein the indication further indicates the one or more parameters to the wireless device, and
wherein the one or more parameters comprises information indicating one or more of:

whether a physical cell identity (PCI) associated with a cell providing coverage to the wireless device will change in connection with the changing to the second ground station;
a change in system information;
a change of any radio access network (RAN) identification;
a change of a timing advance (TA) assumption;
a change of downlink frequency; and
a change of uplink frequency adjustment assumption.

14. The method of claim 13, wherein the indication further indicates a time when the one or more parameters are valid, and where the time is indicated based on a timer or based on when a primary or secondary cell is at a configured elevation angle.

15. The method of claim 10, wherein the indication further indicates a time when the change from the first ground station to the second ground station will occur.

16. The method of claim 10, further comprising:
using a first configuration to communicate with the wireless device prior to the change from the first ground station to the second ground station; and
using a second configuration, different from the first configuration, to communicate with the wireless device in response to the changing from the first ground station to the second ground station,
wherein the second configuration is based on one or more parameters comprising information indicating one or more of:
whether a physical cell identity (PCI) associated with a cell providing coverage to the wireless device will change in connection with the changing to the second ground station;
a change in system information;
a change of any radio access network (RAN) identification;
a change of a timing advance (TA) assumption;
a change of downlink frequency; and
a change of uplink frequency adjustment assumption.

17. The method of claim 10, further comprising receiving a response message from the wireless device, the response message comprising at least one of:
a confirmation that the wireless device received the indication to prepare for the change from the first ground station to the second ground station,
a confirmation that the wireless device has applied a configuration associated with the changing to the second ground station; or
a notification that the wireless device has failed to apply the configuration associated with the changing to the second ground station.

18. The method of claim 10, wherein the indication further indicates that the wireless device is to adjust one or more parameters or assumptions associated with the RLF during the change from the first ground station to the second ground station.

19. A wireless device, comprising:
a memory configured to store instructions; and
processing circuitry configured to execute the instructions, wherein the wireless device is configured to:
receive, from a network, an indication for the wireless device to prepare for a change from a first ground station to a second ground station, wherein each of the first ground station and the second ground station is configured to communicate with the wireless device via one or more satellites, wherein the indication indicates to start a connected discontinuous reception (DRX) during the change from the first ground station to the second ground station, so that the wireless device saves power and does not declare a Radio Link Failure (RLF) if the change from the first ground station to the second ground station takes more than a predetermined period of time to complete;
prepare to change from the first ground station to the second ground station based on the received indication; and
communicate with the second ground station via the one or more satellites.

20. A network node, comprising:
a memory configured to store instructions; and
processing circuitry configured to execute the instructions, wherein the network node is configured to:
determine that a wireless device should prepare for a change from a first ground station to a second ground station, wherein each of the first ground station and the second ground station is configured to communicate with the wireless device via one or more satellites; and
send an indication to the wireless device indicating that the wireless device should prepare for the change from the first ground station to the second ground station, wherein the indication indicates to start a connected discontinuous reception (DRX) during the change from the first ground station to the second ground station, so that the wireless device saves power and does not declare a Radio Link Failure (RLF) if the change from the first ground station to the second ground station takes more than a predetermined period of time to complete.

* * * * *